US010026374B2

(12) United States Patent
Ito et al.

(10) Patent No.: US 10,026,374 B2
(45) Date of Patent: Jul. 17, 2018

(54) LIQUID CRYSTAL DISPLAY APPARATUS

(71) Applicant: NLT TECHNOLOGIES, LTD., Kawasaki, Kanagawa (JP)

(72) Inventors: Hideki Ito, Kanagawa (JP); Hidenori Ikeno, Kanagawa (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 2 days.

(21) Appl. No.: 15/226,969

(22) Filed: Aug. 3, 2016

(65) Prior Publication Data

US 2017/0039975 A1 Feb. 9, 2017

(30) Foreign Application Priority Data

Aug. 7, 2015 (JP) ................. 2015-157249

(51) Int. Cl.
*G09G 3/36* (2006.01)
*G02F 1/1368* (2006.01)
(Continued)

(52) U.S. Cl.
CPC .......... *G09G 3/3677* (2013.01); *G02F 1/1368* (2013.01); *G02F 1/13306* (2013.01); *G02F 1/133345* (2013.01); *G02F 1/133514* (2013.01); *G02F 1/133528* (2013.01); *G02F 1/133707* (2013.01); *G02F 1/134336* (2013.01); *G02F 1/134363* (2013.01); *G02F 1/136286* (2013.01); *G09G 3/3688* (2013.01); *G09G 5/005* (2013.01); *G02F 1/1339* (2013.01); *G02F 1/1341* (2013.01); *G02F 2001/133302* (2013.01); *G02F 2001/134345* (2013.01);
(Continued)

(58) Field of Classification Search
CPC .......... G02F 1/13306; G02F 1/133345; G02F 1/133514; G02F 1/133528; G02F 1/133707; G02F 1/1339; G02F 1/1341; G02F 1/134336; G02F 1/134363; G02F 1/136286; G02F 1/1368; G02F 2001/133302; G02F 2001/134345; G02F 2001/1343; G09G 2300/0426; G09G 2310/08; G09G 2320/0271; G09G 2320/0626; G09G 3/3677; G09G 3/3688
See application file for complete search history.

(56) References Cited

U.S. PATENT DOCUMENTS

2006/0146248 A1* 7/2006 Park .................. G02F 1/134363
349/141
2007/0080370 A1* 4/2007 Miyachi ............. G02F 1/13624
257/107

(Continued)

FOREIGN PATENT DOCUMENTS

JP   2008-39806 A   2/2008
JP   2009-186869 A  8/2009

*Primary Examiner* — Hong Zhou
(74) *Attorney, Agent, or Firm* — Sughrue Mion, PLLC

(57) ABSTRACT

A liquid crystal display apparatus comprises a planar first electrode, multiple second electrodes and third electrodes that overlap with the first electrode and are alternately arranged, in correspondence to one subpixel. The second electrode and the third electrode are independently driven. A voltage for driving the liquid crystal is individually applied between the second electrode and the first electrode and between the third electrode and the first electrode.

15 Claims, 28 Drawing Sheets

(51) Int. Cl.
  *G02F 1/1335* (2006.01)
  *G02F 1/1362* (2006.01)
  *G02F 1/1343* (2006.01)
  *G02F 1/1333* (2006.01)
  *G02F 1/133* (2006.01)
  *G02F 1/1337* (2006.01)
  *G09G 5/00* (2006.01)
  G02F 1/1339 (2006.01)
  G02F 1/1341 (2006.01)
  G09G 3/20 (2006.01)

(52) U.S. Cl.
  CPC ............ *G02F 2001/134372* (2013.01); *G09G 3/2096* (2013.01); *G09G 2300/0426* (2013.01); *G09G 2300/0495* (2013.01); *G09G 2310/0243* (2013.01); *G09G 2310/08* (2013.01); *G09G 2320/0271* (2013.01); *G09G 2320/0626* (2013.01)

(56) References Cited

U.S. PATENT DOCUMENTS

| | | | |
|---|---|---|---|
| 2010/0103085 A1* | 4/2010 | Lee ................... | G02F 1/134363 345/92 |
| 2012/0293756 A1* | 11/2012 | Matsumoto ....... | G02F 1/134363 349/106 |
| 2014/0016075 A1* | 1/2014 | Iwata ................ | G02F 1/134363 349/141 |
| 2014/0111099 A1* | 4/2014 | Liu ................... | G02F 1/134363 315/160 |
| 2014/0146255 A1* | 5/2014 | Xie .................... | G02F 1/13624 349/37 |

\* cited by examiner

F I G. 1
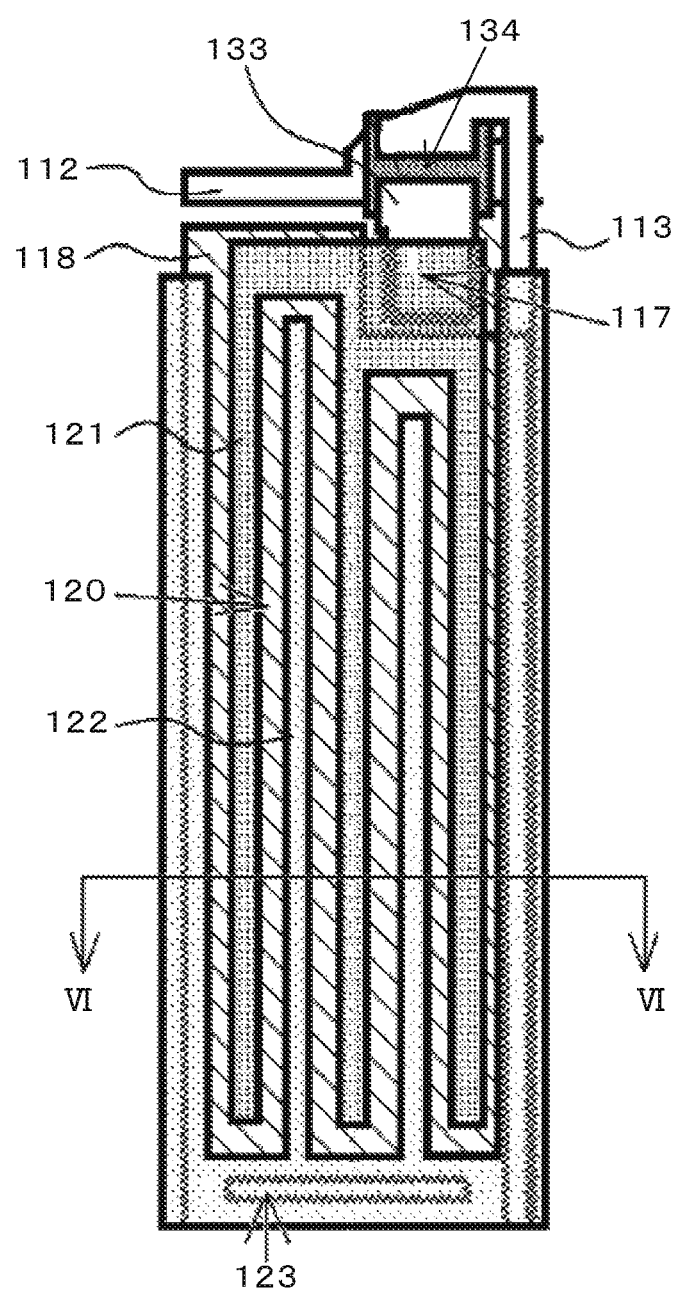

F I G. 3
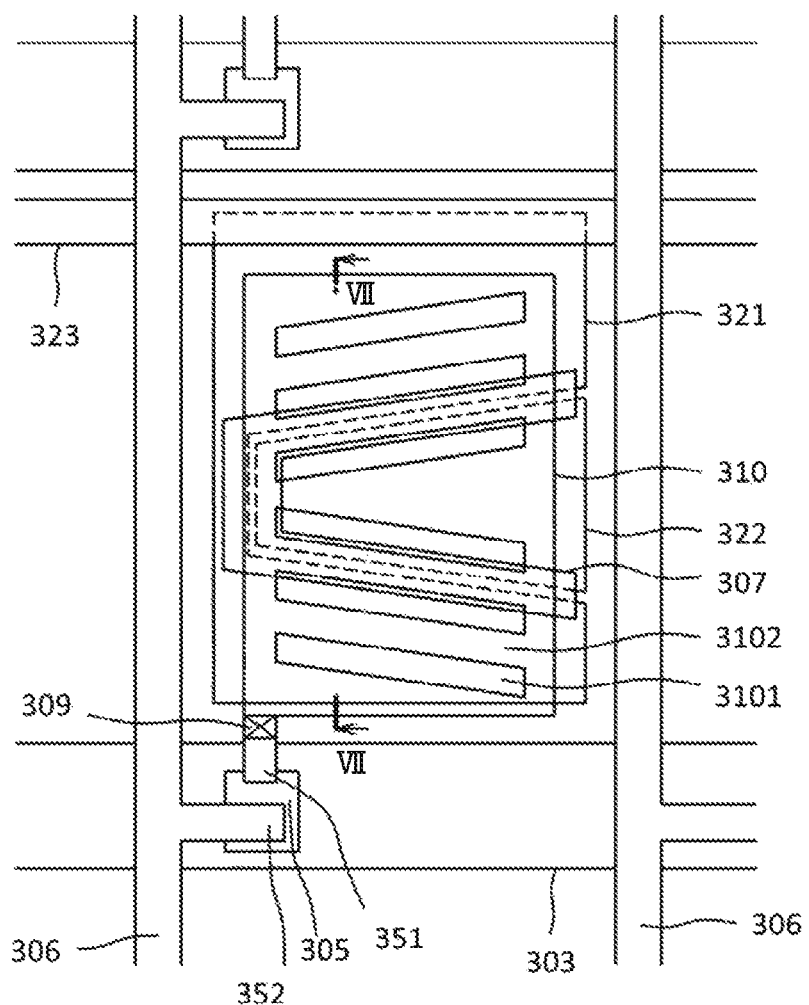

FIG. 14

| DRIVING CONDITION | O | A | | | | | B | | |
|---|---|---|---|---|---|---|---|---|---|
| | | Va | Vb | Vc | Vd | Ve | Vf | Vg | Vh |
| LIGHT TRANSMITTANCE | O | O | | | | T1 | | | T(Vw) |
| DRIVING POTENTIAL APPLIED TO THE SECOND ELECTRODE (V) | | 0.6 | 1.0 | 1.6 | 2.5 | | 3.8 (Vw) | | |
| DRIVING POTENTIAL APPLIED TO THE THIRD ELECTRODE (V) | | 0 | 0 | 0 | 0 | 0 | 2.6 | 3.4 | 3.8 (Vw) |

FIG. 15

| DRIVING CONDITION | O | Va | Vb | A |  |  | B |  |  |
|---|---|---|---|---|---|---|---|---|---|
|  |  |  |  | Vc | Vd | Ve | Vf | Vg | Vh |
| LIGHT TRANSMITTANCE |  |  |  |  |  | T1 |  |  | T(Vw) |
| DRIVING POTENTIAL APPLIED TO THE SECOND ELECTRODE (V) | 0 | 0.6 | 1.0 | 1.6 | 2.5 |  | 3.8 (Vw) | | |
| DRIVING POTENTIAL APPLIED TO THE THIRD ELECTRODE (V) | 0 | 0 | 0 | 0 | 0 | 1.7 (V1) | 2.6 | 3.4 | 3.8 (Vw) |

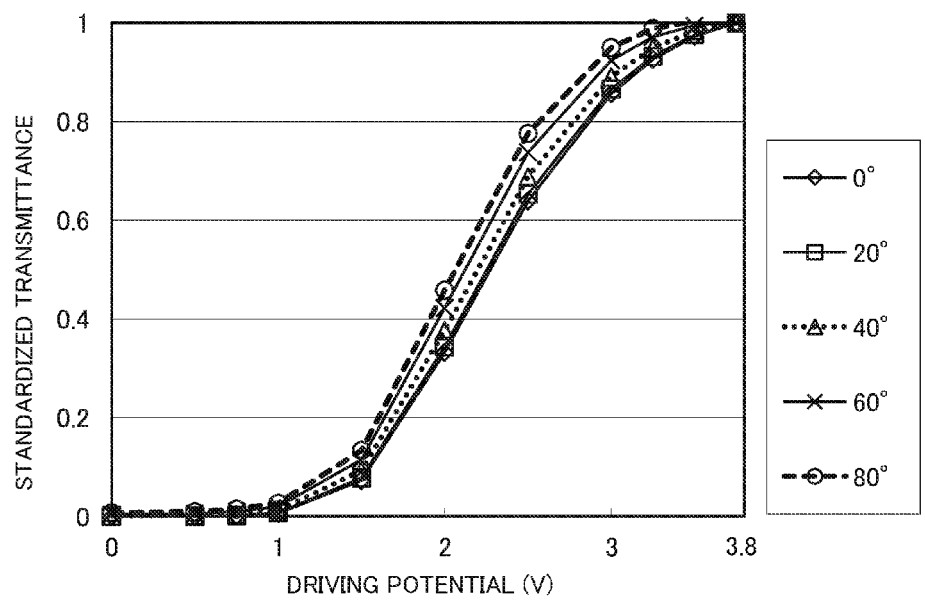
F I G. 17A
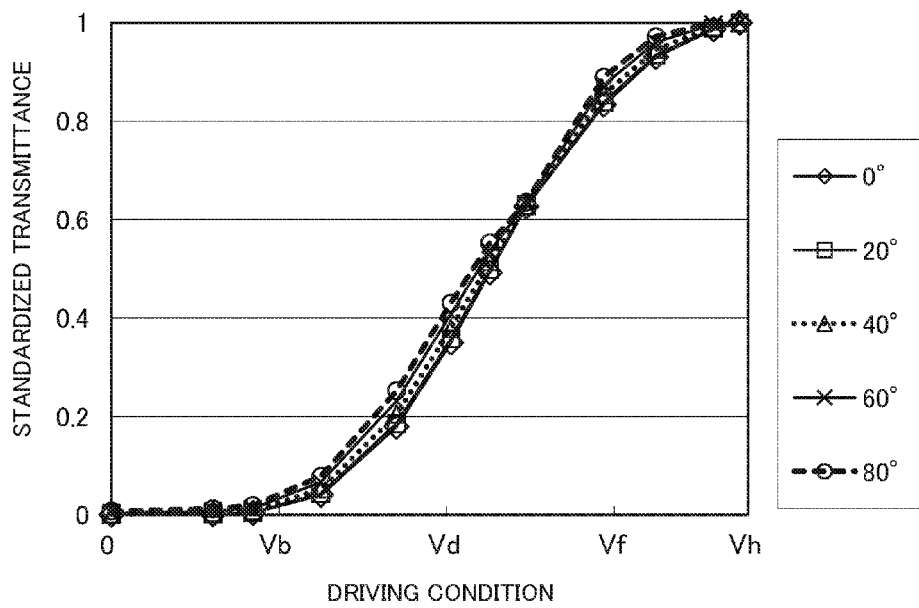
F I G. 17B

F I G. 1 8 A
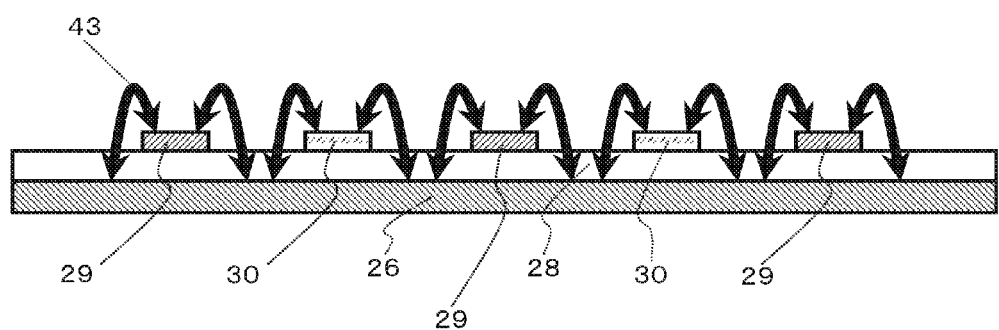
F I G. 1 8 B
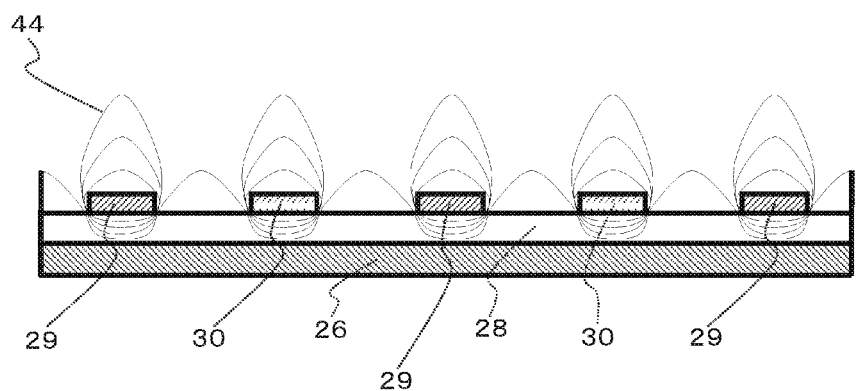

LIQUID CRYSTAL DISPLAY APPARATUS

CROSS-REFERENCE TO RELATED APPLICATIONS

This non-provisional application claims priority under 35 U.S.C. § 119(a) on Patent Application No. 2015-157249 filed in Japan on Aug. 7, 2015, the entire contents of which are hereby incorporated by reference.

BACKGROUND

1. Technical Field

The present invention relates to a liquid crystal display apparatus for displaying an image, and more specifically to a liquid crystal display apparatus of a transverse electric field mode capable of enlarging a viewing angle.

2. Description of the Related Art

In recent years, as a display mode for a liquid crystal display apparatus, a transverse electric field mode represented by Fringe-Field Switching (FFS) or In-Plane Switching (IPS) with preferable viewing angle characteristics has widely been employed. Moreover, for a television receiver, in addition to the screen resolution of Full High Definition (FHD, 1920×1080 pixels) which is a current mainstream, the screen resolution of 4K2K (3840×2160 pixels) is becoming widespread. Furthermore, in the near future, the screen resolution of 8K4K (7680×4320 pixels) is expected to rise in the field. It is predicted that the screen size is enlarged as the resolution is increased, and therefore the demand for enhancement in the viewing angle characteristics may also be further increased.

In a liquid crystal display apparatus of the IPS mode, in the front view, two types of comb-like electrodes (pixel electrode and common electrode) are arranged at intervals. An electric field is applied between the pixel electrode and the common electrode so as to drive liquid crystal molecules. The alignment of liquid crystal molecules will not show a large change even if the viewing angle is changed, which allows an observer to change the viewing direction without a large change in the display, thereby presenting preferable viewing angle characteristics. In a liquid crystal display apparatus of the FFS mode, on the other hand, a planar common electrode and a smaller pixel electrode are arranged with an insulating layer interposed in between. An electric field called a fringe electric field applied between the pixel electrode and the common electrode is used to drive liquid crystal molecules. In the FFS mode, since the fringe electric field includes more electric fields having components in a direction orthogonal to a substrate compared to the IPS mode, liquid crystal molecules are more likely deformed in unintended vertical directions. This deteriorates the viewing angle characteristics and thereby degrading the viewing angle characteristics compared to that in the IPS mode. This is a difference between the IPS and FFS, both of which are the types of the transverse electric field mode.

Japanese Patent Application Laid-Open Publication No. 2009-186869 proposes a liquid crystal display apparatus of the IPS mode also provided with the characteristics of the FFS mode. FIG. 1 is a schematic front view of the liquid crystal display apparatus described in Japanese Patent Application Laid-Open Publication No. 2009-186869 from which a color filter substrate is excluded, illustrating a part corresponding to one subpixel. A similar drawing is illustrated in FIG. 1 of Japanese Patent Application Laid-Open Publication No. 2009-186869. FIG. 2 is a cross-section view along the line VI-VI in FIG. 1. A similar drawing is illustrated in FIG. 3 of Japanese Patent Application Laid-Open Publication No. 2009-186869. A liquid crystal layer 130 is disposed between an array substrate AR and a color filter substrate CF. The array substrate AR, the color filter substrate CF and the liquid crystal layer 130 are arranged between a first polarization plate 131 and a second polarization plate 132. The array substrate AR includes the first transparent substrate 111 on which a gate insulating film 114 is formed, and a data line (signal line) 113 as well as a passivation film 115 are further formed on the gate insulating film 114. A planarized film 116 is formed on the passivation film 115. A third electrode 118 is disposed solidly on the planarized film 116, while an insulating film 119 is formed on the third electrode 118. On the insulating film 119, a first electrode 121 and a second electrode 122 both having comb-like shapes are arranged with a clearance 120 in between. The first electrode 121 and the second electrode 122 are covered with a first alignment film 124. The color filter substrate CF includes a second transparent substrate 125, a light shielding film 126, a color filter film 127, an overcoat film 128 and a second alignment film 129.

The first electrode 121 is electrically connected to a drain electrode 133 of a TFT 134 through the first contact hole 117 formed in the insulating film 119, planarized film 116 and passivation film 115. The second electrode 122 is electrically connected to a third electrode 118 through the second contact hole 123 formed in the insulating film 119. An electric field E1 is applied between the first electrode 121 and the second electrode 122, and an electric field E2 is applied between the first electrode 121 and the third electrode 118. As the first electrode 121 and the second electrode 122 are on the same plane, the movement of liquid crystal molecules by the electric field E1 is similar to that in the liquid crystal display apparatus of the IPS mode. Moreover, as the first electrode 121 and the third electrode 118 are overlapped with each other in the front view via the insulating film 119, the movement of liquid crystal molecules by the electric field E2 is similar to that in the liquid crystal display apparatus of the FFS mode. Japanese Patent Application Laid-Open Publication No. 2009-186869 describes that a liquid crystal display apparatus with a bright display having advantages of both IPS and FFS may be obtained by being provided with functions of both modes, in which a high aperture ratio as well as high luminance may be obtained while image persistence and flickering may be suppressed.

Japanese Patent Application Laid-Open Publication No. 2008-39806 proposes a technique of improving viewing angle characteristics at high gradation levels in the FFS mode. FIG. 3 is a front view of the liquid crystal display apparatus described in Japanese Patent Application Laid-Open Publication No. 2008-39806, illustrating a part corresponding to one subpixel. FIG. 4 is a cross-section view along the line VII-VII in FIG. 3. A first common electrode 321, a second common electrode 322 and a gate insulating film 304 are formed on the substrate 301, while a capacitance electrode 307 and an interlayer insulating film 308 are formed on the gate insulating film 304. A planar pixel electrode 310 is formed on the interlayer insulating film 308. At the pixel electrode 310, a slit 3101 and a comb electrode 3102 are formed. The pixel electrode 310 is covered with an alignment film 311. The pixel electrode 310, the first common electrode 321 and the second common electrode 322 are formed of transparent electrodes. On the color filter substrate 313, a color filter 314 and an alignment film 311 are laminated. A liquid crystal layer 3121 is arranged between two alignment films 311. On a scanning line (gate line) 303, an amorphous Si film 305 is formed via the gate insulating film 304, and a drain electrode 351 as well as a source electrode 352 connected to the amorphous Si film 305 are also formed. The pixel electrode 310 is connected to the drain electrode 351 via a through hole 309. The source electrode 352 is integrally formed with the data line (source line) 306. The first common electrode 321 is connected to a common wiring 323.

A common voltage which is a constant voltage is applied from the common wiring 323 to the first common electrode 321. While the second common electrode 322 is a float electrode, it is capacitively coupled with the first common electrode 321 via the capacitance electrode 307. As illustrated in FIG. 4, the capacitance electrode 307 is formed on the gate insulating film 304 while being planarly overlapped with the first common electrode 321 and the second common electrode 322. The potential of the capacitance electrode 307 is a float potential. A capacitance Cb1 is formed between the capacitance electrode 307 and the first common electrode 321, while a capacitance Cb2 is formed between the capacitance electrode 307 and the second common electrode 322.

As illustrated in FIG. 4, the electrical flux lines from the upper surface of the comb electrode 3102 of the pixel electrode 310 permeate the liquid crystal layer 3121 and extend toward the first common electrode 321 and the second common electrode 322. The potential of the second common electrode 322 for moving liquid crystal corresponds to the potential obtained by capacitively dividing the potential of the pixel electrode 310 and a common potential by the capacitance between the second common electrode 322 and the pixel electrode 310 through the liquid crystal and by the capacitance between the second common electrode 322 and the first common electrode 321 through the capacitance electrode 307.

Accordingly, two electric field for driving liquid crystal are present in the same pixel. That is, as illustrated in FIG. 4, an electric field Ec acting on the liquid crystal above the second common electrode 322 near the center of the pixel and a larger electric field Ep acting on the liquid crystal above the first common electrode 321 are located at either side of the second common electrode 322. Japanese Patent Application Laid-Open Publication No. 2008-39806 describes that the viewing angle characteristics are improved by the two different electric fields Ec and Ep (Ec<Ep), mainly due to the electric field Ec being smaller than the electric field Ep.

SUMMARY OF THE INVENTION

When simulating the properties of the voltage and light transmittance of the device described in Japanese Patent Application Laid-Open Publication No. 2009-186869, no such a behavior that assures increased luminance is obtained. FIG. 5 is a cross-section view of an assumption model of the structure of the liquid crystal display apparatus described in Japanese Patent Application Laid-Open Publication No. 2009-186869. FIG. 5 illustrates the first electrode 221, the second electrode 222, the third electrode 218, the insulating film 219, the first alignment film 224, the second alignment film 229 and the liquid crystal layer 230. The thickness of the liquid crystal layer is denoted by 234, the width of the first electrode 221 is denoted by 235, and the width of the second electrode 222 is denoted by 236 in FIG. 5. It is assumed here that the insulating film 219 is a silicon nitride film (SiNx) with the film thickness of 2000 Å, the clearance 220 is 5 µm, the thickness 234 of the liquid crystal layer 230 is 3.5 µm, and the width 235 of the first electrode 221 as well as the width 236 of the second electrode 222 are set to 3 µm. Glass substrates are disposed below the first alignment film 224 and over the second alignment film 229, respectively. Polarization plates are bonded to both sides of the liquid crystal layer 230, respectively, arranged in a relation of crossed Nicol. The glass substrates and the polarization plates are not illustrated in the drawing. The initial alignment of liquid crystal molecules is set as 7° with respect to the direction in which the first electrode 221 and the second electrode 222 extend, so as to conform to the absorption axis of the polarization plate located at the lower side. Moreover, general values are used for the liquid crystal parameters. The liquid crystal parameters will not be described in detail.

Now, the conditions for the first electrode 221, the second electrode 222 and the third electrode 218 in the simulation will be described. First, supposing that the structure of the liquid crystal display apparatus described in Japanese Patent Application Laid-Open Publication No. 2009-186869 is used, the potentials of the second electrode 222 and the third electrode 218 are fixed to a reference potential, and the potential of the first electrode 221 is changed from the reference potential to +4V to calculate the voltage dependency of the light transmittance. This is indicated as (1). Next, supposing that the FFS mode is employed, the potential of the third electrode 218 is fixed to the reference potential, and the potentials of the first electrode 221 and the second electrode 222 are changed from the reference potential to +4V to calculate the voltage dependency of the light transmittance. This is indicated as (2). Furthermore, the potential of the third electrode 218 is fixed to the reference potential, and the second electrode 222 is made electrically floating, and the potential of the first electrode 221 is changed from the reference potential to +4V, to calculate the voltage dependency of the light transmittance. These conditions are set under the assumption that no potential is applied to the second electrode 222 in (1) and no electric field occurs between the first electrode 221 and the second electrode 222, producing no effect of the so-called IPS mode. This is indicated as (3).

FIG. 6 is a characteristic view illustrating the calculated results of the light transmittance in the cross-section model illustrated in FIG. 5. FIG. 6 illustrates the calculated results of light transmittance under the conditions of (1), (2) and (3). The horizontal axis in the drawing indicates voltage between the third electrode 218 and the first electrode 221, whereas the vertical axis indicates the light transmittance by an arbitrary unit (a.u.). Furthermore, the calculation result under the condition of (1) is represented by white circular markers, the calculation result under the condition of (2) is represented by black circular markers, and the calculation result under the condition of (3) is represented by triangular markers. In the present model, the calculation result under the condition of (1) is substantially the same as the calculation result under the condition of (3). Comparing at the voltage of 4V, the light transmittance is the largest under the condition of (2), whereas the light transmittance is substantially the same under the conditions of (1) and (3), showing approximately 65% of the light transmittance under the condition of (2). The calculation results mean that the IPS mode has little effect under the condition of (1) despite the expectation, and that the liquid crystal molecules are mostly driven by the fringe electric field. In other words, the liquid crystal display apparatus described in Japanese Patent Application Laid-Open Publication No. 2009-186869 acts similarly to the case in the FFS mode at least under the conditions described above, which lowers the light transmittance. Comparing the condition of (1) with the condition of (2), however, the condition of (1) decreases the region where the fringe electric field is generated, which thus decreases the region where the electric field with a component in the direction orthogonal to the substrate. This results in reduction of the region where liquid crystal molecules are deformed in the vertical direction in the state where the voltage is 4V, thereby suppressing deterioration of the viewing angle characteristics.

As described above, in the liquid crystal display apparatus described in Japanese Patent Application Laid-Open Publication No. 2009-186869, the region where the fringe electric field is generated decreases, which further reduces the region where the liquid crystal molecules are deformed in the vertical direction, thereby suppressing deterioration of the viewing angle characteristics. Meanwhile, as illustrated by the simulation results described earlier, such a problem arises that the light transmittance is lowered.

Moreover, in the liquid crystal display apparatus described in Japanese Patent Application Laid-Open Publication No. 2008-39806, as the electric fields Ec and Ep are generated, though different in its magnitude, in the range from a black display to a medium-tone display, the region where the fringe electric field is generated in a pixel remains the same regardless of the capacitance coupling structure. Accordingly, the region where the liquid crystal molecules are deformed due to the vertical components in the fringe electric field is also the same. That is, the viewing angle characteristics is improved because the fringe electric field at a part of a pixel is reduced, not because the region where liquid crystal molecules are deformed due to the vertical components in the fringe electric field is reduced, which produces only a limited effect. Furthermore, as the fringe electric field in a part of a pixel is smaller, the light transmittance is lowered.

A liquid crystal display apparatus according to the first aspect of the present disclosure, comprising: a pair of substrates; liquid crystal held between the pair of substrates; a plurality of scanning lines arranged on one substrate of the pair of substrates; a plurality of data lines arranged on the one substrate so as to cross the scanning lines; a transparent and planar first electrode arranged, on the one substrate, in a region opened in correspondence to each of a plurality of subpixels arranged in matrix divided by the scanning lines and the data lines; and at least one second electrode and at least one third electrode alternately arranged in a front view above the first electrode with an insulating film intervening. The second electrode and the third electrode are independently driven. A voltage for driving the liquid crystal is individually applied between the second electrode and the first electrode and between the third electrode and the first electrode.

In the liquid crystal display apparatus, two scanning lines are included in a region of the subpixel, active elements are provided respectively for the two scanning lines, and the second electrode and the third electrode are driven respectively by the active elements.

In the liquid crystal display apparatus, a reference potential is applied to the first electrode, a potential for gradation-driving is applied to the second electrode in a case where a gradation level in the subpixel is in a range from a lowest gradation level to a specific gradation level, and the reference potential is applied to the third electrode in the case where the gradation level in the subpixel is in a range from the lowest gradation level to the specific gradation level, and the potential for gradation-driving is applied to the third electrode in a case where the gradation level is in a range from a gradation level one higher than the specific gradation level to a highest gradation level.

Here, in the range from the lowest gradation level to a specific gradation level, the fringe electric field generated by the potential difference between the first electrode and the second electrode is used to drive liquid crystal molecules, thereby causing no fringe electric field between the first electrode and the third electrode. Thus, the overall region where the fringe electric field is generated is reduced, which further reduces the electric field with components in a direction orthogonal to the substrate. As such, the liquid crystal molecules are less likely to be deformed in the vertical direction, making it possible to suppress deterioration in the viewing angle characteristics.

Moreover, the potential for gradation driving is gradually applied to the third electrode in the range from a gradation level one higher than the specific gradation level to the highest gradation level, the electric field of the component in the direction orthogonal to the substrate is also gradually increased. Finally, the component in the direction orthogonal to the substrate at the highest gradation level has the largest electric field. The electric field of the components in the direction orthogonal to the substrate here is the same as the electric field of the components in the direction orthogonal to the substrate in the state where the second electrode and the third electrode are simultaneously gradation-driven with the same potential as in the conventional FFS mode to reach the highest gradation level, and will not be increased further.

In the liquid crystal display apparatus according to the second aspect of the present application, the storage capacitance formed by the first electrode and the second electrode is substantially the same as the storage capacitance formed by the first electrode and the third electrode.

Furthermore, in the liquid crystal display apparatus, preferably, the capacitance parasitic on each of the active elements in the region of the subpixel is substantially the same.

Here, the feed through voltage received by the second electrode and the third electrode is the same, and thus the electrical characteristics of the second electrode and the third electrode are also the same, which allows the subpixel to show stable display characteristics.

In the liquid crystal display apparatus according to the third aspect of the present application, the second electrode and the third electrode are formed on different insulating films.

Here, short-circuiting between the second electrode and the third electrode may be avoided. Furthermore, compared to the case where the second electrode and the third electrode are formed on the same insulating film, the constraint for keeping the distance between the second electrode and the third electrode may be alleviated.

The above and further objects and features will more fully be apparent from the following detailed description with accompanying drawings.

It is to be understood that both the foregoing general description and the following detailed description are exemplary and explanatory and are not restrictive of this disclosure.

BRIEF DESCRIPTION OF DRAWINGS

FIG. 1 is a schematic front view of the liquid crystal display apparatus described in Japanese Patent Application Laid-Open Publication No. 2009-186869 from which a color filter substrate is excluded, illustrating a part corresponding to one subpixel;

FIG. 3 is a front view of the liquid crystal display apparatus described in Japanese Patent Application Laid-Open Publication No. 2008-39806, illustrating a part corresponding to one pixel;

FIG. 14 is a table illustrating the driving conditions for the second electrode and the third electrode;

FIG. 15 is a table illustrating another example of the driving conditions for the second electrode and the third electrode;

FIG. 17A is a characteristic diagram illustrating the result of simulation for the light transmittance when the azimuth is 90°;

FIG. 17B is a characteristic diagram illustrating the result of simulation for the light transmittance when the azimuth is 90°;

FIG. 18A is a schematic cross-section view illustrating the state of an electric field in the case where a driving potential of the same magnitude is simultaneously applied to the second electrode and the third electrode;

FIG. 18B is a schematic cross-section view illustrating the state of a potential in the case where a driving potential of the same magnitude is simultaneously applied to the second electrode and the third electrode;

DETAILED DESCRIPTION

Embodiments of the present disclosure will specifically be described below with reference to the drawings illustrating the embodiments thereof.

Embodiment 1

Figure 2:
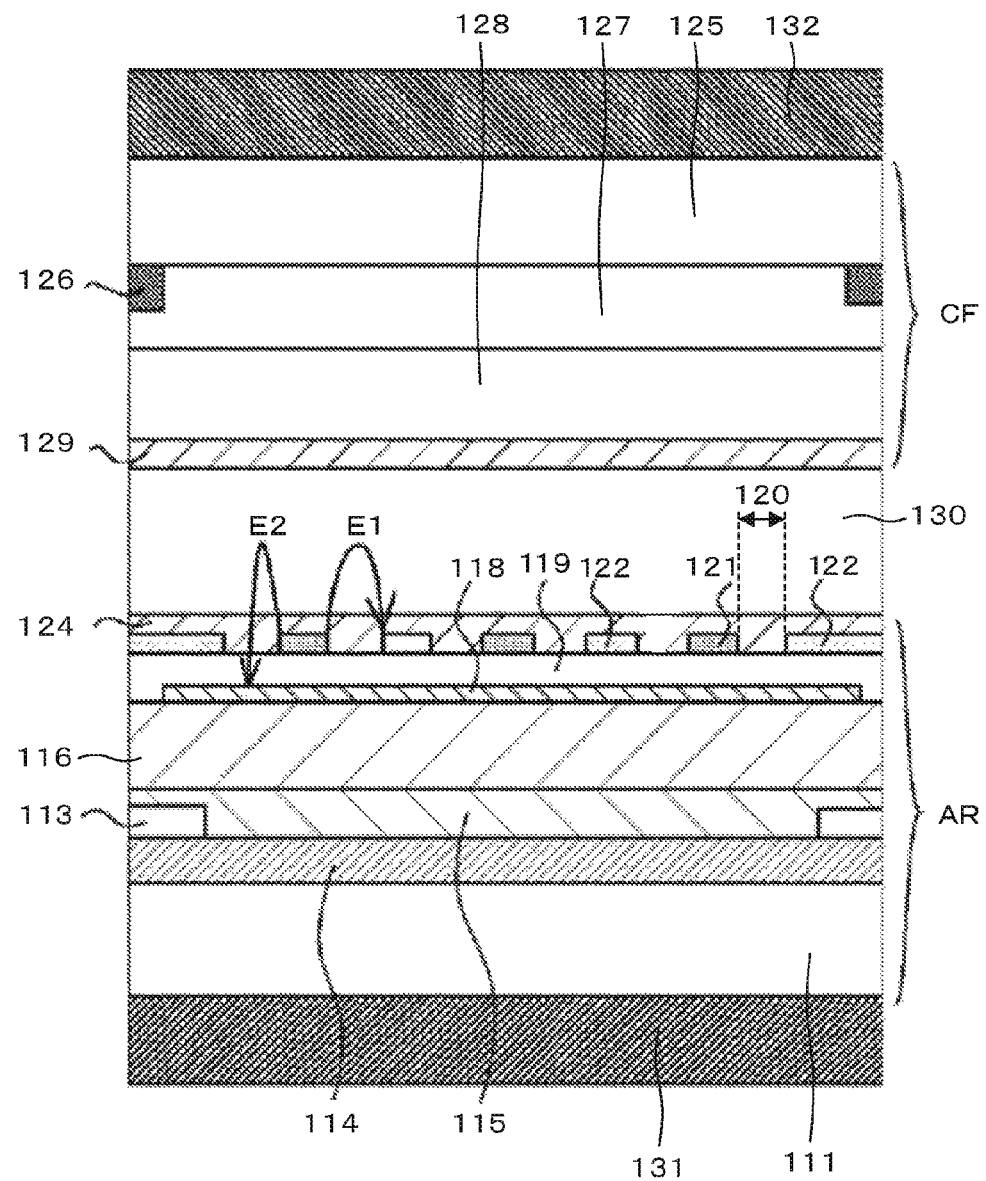
FIG. 2 is a cross-section view along the line VI-VI in FIG. 1.
Figure 4:
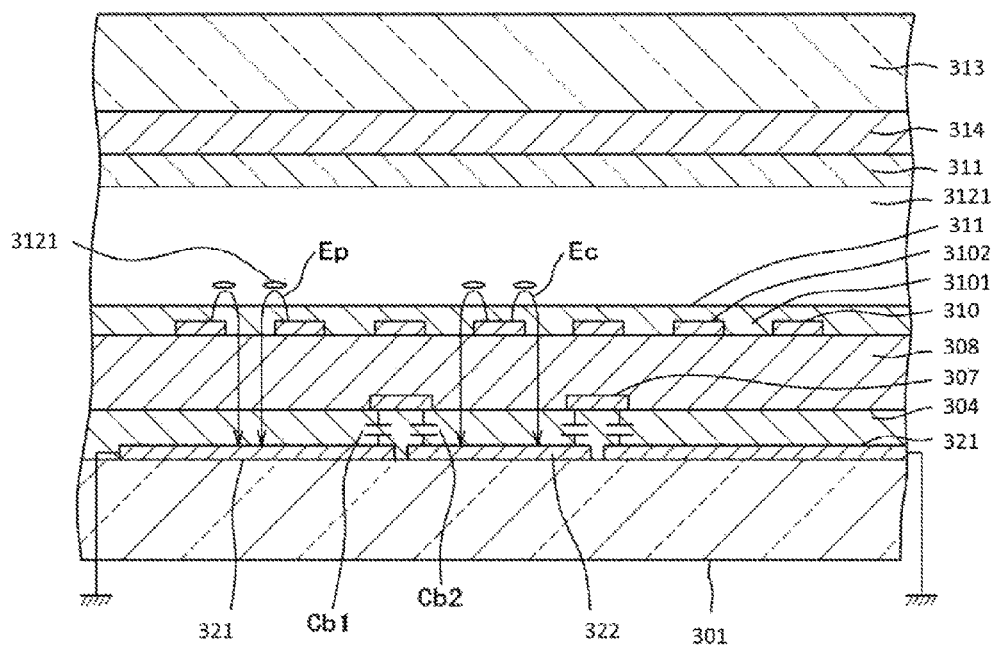
FIG. 4 is a cross-section view along the line VII-VII in FIG. 3.
Figure 5:
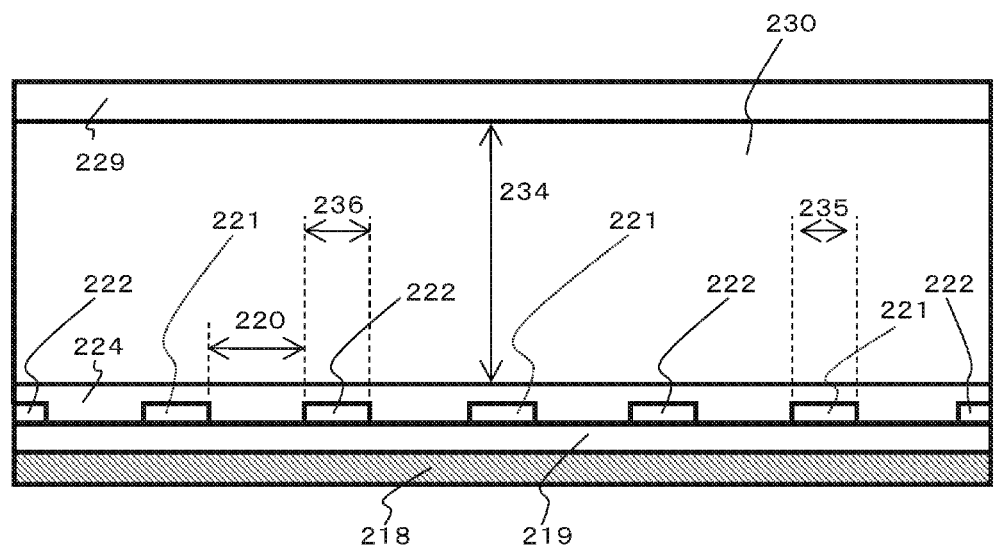
FIG. 5 is a cross-section view of an assumption model of the structure of the liquid crystal display apparatus described in Japanese Patent Application Laid-Open Publication No. 2009-186869.
Figure 6:
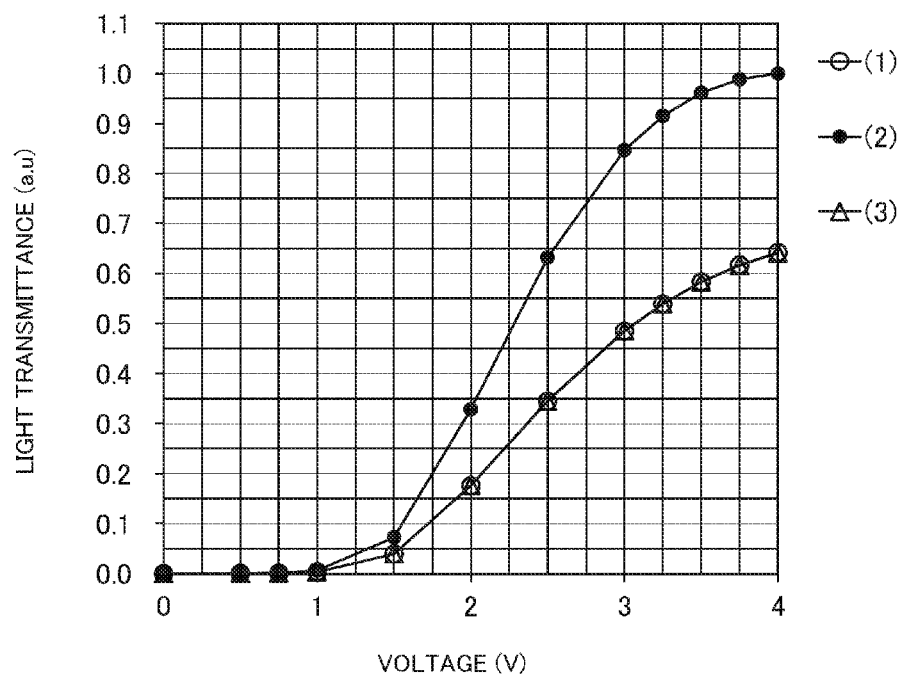
FIG. 6 is a characteristic view illustrating the calculated results of the light transmittance in the cross-section model illustrated in FIG. 5.
Figure 7:
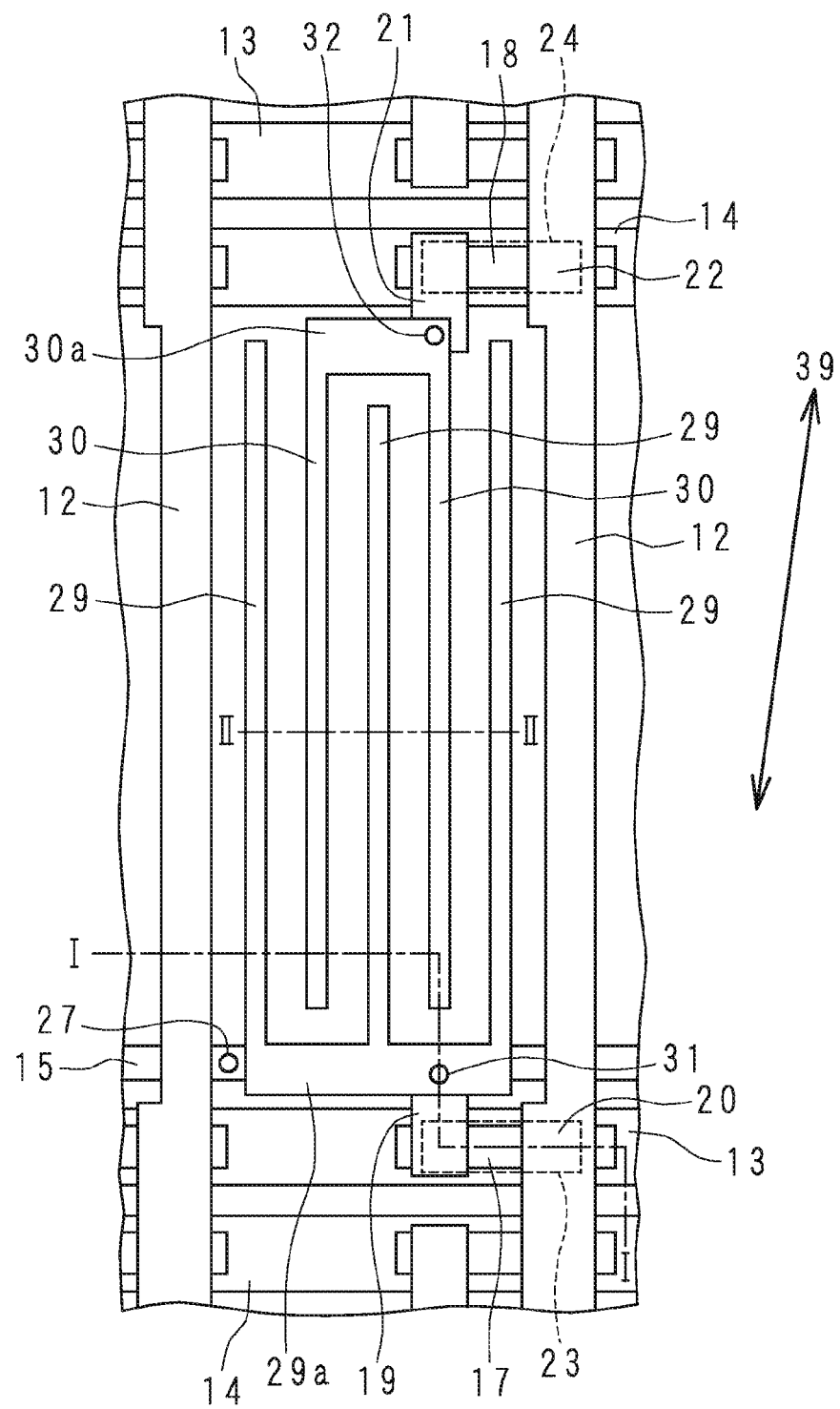
FIG. 7 is a front view illustrating the configuration for one subpixel of the liquid crystal display apparatus according to Embodiment 1 of the present disclosure.
Figure 8:
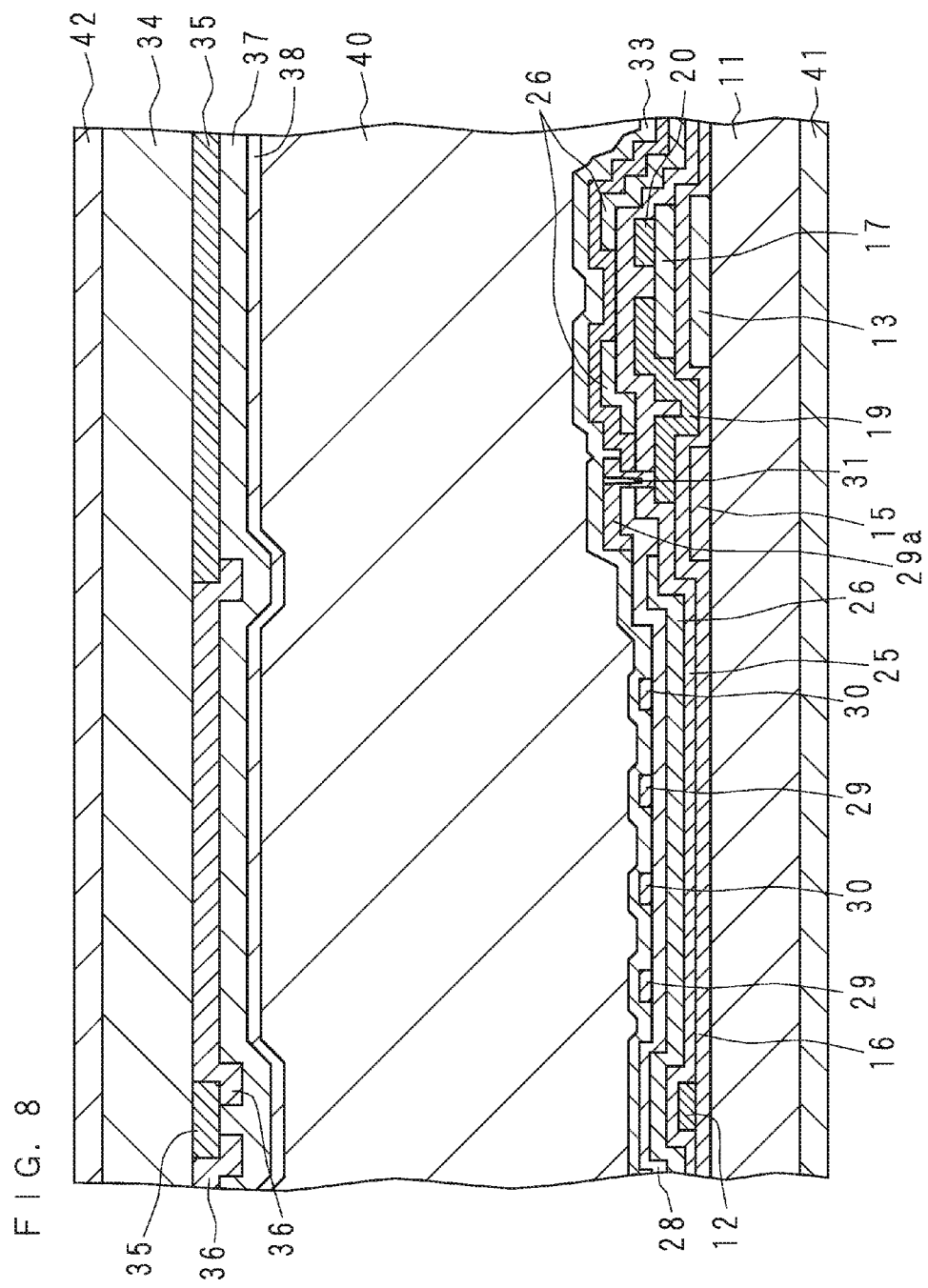
FIG. 8 is a cross-section view along the line I-I in FIG. 7.

FIG. 7 is a front view illustrating the configuration for one subpixel of the liquid crystal display apparatus according to Embodiment 1 of the present disclosure. FIG. 8 is a cross-section view along the line I-I in FIG. 7. FIG. 8 illustrates a thin film transistor (TFT) substrate including a circuit employing a TFT which is an active element, a liquid crystal layer and an opposing substrate which is opposed to the TFT substrate. Embodiment 1 illustrated in FIG. 7 and FIG. 8 will be described below in detail.

A liquid crystal display apparatus includes multiple scanning lines and multiple data lines crossing the scanning lines. Multiple subpixels constituting an image displayed on the liquid crystal display apparatus are arranged in matrix which is divided by the scanning lines and the data lines. In the TFT substrate, subpixel regions corresponding to multiple subpixels are arranged in matrix on a first transparent insulating substrate 11. Each subpixel region is enclosed by two adjacent data lines 12, a first scanning line 13 and a second scanning line 14. The first scanning line 13, the second scanning line 14 and a common wiring 15 are arranged in the same layer on the first transparent insulating substrate 11.

On the first insulating film 16, a first semiconductor layer 17 is arranged like an island above the first scanning line 13, while a second semiconductor layer 18 is arranged like an island above the second scanning line 14. Furthermore, a data line 12, a first source electrode 19, a first drain electrode 20, a second source electrode 21 and a second drain electrode 22 are arranged. The first drain electrode 20 and the second drain electrode 22 constitute a part of the data line 12. The first active element 23 is constituted with the first scanning line 13 set as a gate electrode while including the first semiconductor layer 17, the first source electrode 19 and the first drain electrode 20. The second active element 24 is constituted with the second scanning line 14 set as a gate electrode while including the second semiconductor layer 18, the second source electrode 21 and the second drain electrode 22. Each of the first active element 23 and the second active element 24 is a TFT.

On the second insulating film 25, the first electrode 26 is arranged in a region, in a solid (planar) manner, excluding the channel portion of the first active element 23 and the periphery thereof, the channel portion of the second active element 24 and the periphery thereof, a part of the first source electrode 19 and a part of the second source electrode 21. The first electrode 26 is electrically connected to the common wiring 15 through the first contact hole 27 opened in the first insulating film 16 and the second insulating film 25. The first electrode 26 is not illustrated in FIG. 7. The first electrode 26 is formed continuously across multiple subpixel regions.

On the third insulating film 28, multiple second electrodes 29 and third electrodes 30 are arranged in the same layer. The second electrode 29 and the third electrode 30 are linear and are alternately arranged in parallel with one another in the front view. The second electrode 29 and the third electrode 30 are separated from each other in the front view. The second electrodes 29 are connected to an electrode 29a at one end in the subpixel region. The third electrodes 30 are connected to an electrode 30a at the other end in the subpixel region. The electrode 29a is electrically connected to the first source electrode 19 through the second contact hole 31 opened in the second insulating film 25 and the third insulating film 28. The electrode 30a is electrically connected to the second source electrode 21 through the third contact hole 32 opened in the second insulating film 25 and the third insulating film 28.

As described above, one subpixel region is connected to one data line 12 and two scanning lines. In the liquid crystal display apparatus according to the present embodiment, therefore, the number of scanning lines is twice as that in the conventional case. The second electrodes 29 are driven by the first active element 23, whereas the third electrodes 30 are driven by the second active element 24.

A method of manufacturing the liquid crystal display apparatus according to the present embodiment will now be described. First, on a glass substrate which is the first transparent insulating substrate 11, a first metal layer made of, for example, aluminum alloy is formed with a thickness of 300 nm by sputtering, and is patterned with the first scanning line 13, the second scanning line 14 and the common wiring 15. Next, after the first insulating film 16 of, for example, 100 nm of silicon oxide is deposited as a gate insulating film, Plasma Chemical Vapor Deposition (PCVD) is used to successively deposit 300 nm of silicon nitride, 170 nm of intrinsic amorphous Silicon (i-a-Si) and 30 nm of n-type amorphous Silicon (n-a-Si). The layered films of i-a-Si and n-a-Si are removed by etching while leaving portions to be the first semiconductor layer 17 and the second semiconductor layer 18 in island forms.

Next, a second metal layer made of, for example, aluminum alloy is formed with a thickness of 300 nm by sputtering, and is patterned with the data line 12, the first source electrode 19, the first drain electrode 20, the second source electrode 21 and the second drain electrode 22. Here, two TFTs are formed in a subpixel region. The TFT constituted by including a part of the first scanning line 13, the first insulating film 16, the first semiconductor layer 17, the first source electrode 19 and the first drain electrode 20 is set as the first active element 23. The TFT constituted by including a part of the second scanning line 14, the first insulating film 16, the second semiconductor layer 18, the second source electrode 21 and the second drain electrode 22 is set as the second active element 24. The first active element 23 and the second active element 24 are designed with the same dimensions, and preferably have substantially the same switching characteristic.

Next, using the second metal layer as a mask, unwanted part of n-a-Si layers are removed by etching from the first semiconductor layer 17 and the second semiconductor layer 18 that are to be TFTs. Subsequently, a second insulating film 25 of, for example, 500 nm of silicon nitride is deposited as a passivation film. For the second insulating film 25, 300 nm of silicon nitride and 1500 nm of polyimide film may alternatively be formed. In such a case, the polyimide film serves to planarize the subpixel region and to reduce the capacitance unnecessary for driving the subpixel.

Next, a first contact hole 27 is formed by etching through the first insulating film 16 and the second insulating film 25. Subsequently, a first transparent conductive film such as Indium Tin Oxide (ITO) with the thickness of 40 nm is formed by sputtering, and is so patterned that the first electrode 26 is not located around a second contact hole 31 and a third contact hole 32 which will be described later. Here, the first electrode 26 is solidly arranged in a region where no metal layer is formed, which is a region opened corresponding to the subpixel. The patterning may be so carried out that the first electrode 26 arranged to cover the first scanning line 13 and the second scanning line 14 is not arranged directly above the channel portion of the TFT. With the procedure described above, the first electrode 26 is electrically connected to the common wiring 15 through the first contact hole 27.

Next, a third insulating film 28 of, for example, 200 nm of silicon nitride is deposited as an interlayer insulating film. Subsequently, the second contact hole 31 and the third contact hole 32 are formed by etching through the second insulating film 25 and the third insulating film 28. Moreover, in the procedure, at the same time, portions of the first insulating film 16, the second insulating film 25 and the third insulating film 28 are removed by etching so as to expose a metal layer at terminals of the first scanning line 13, the second scanning line 14 and the data line 12 extracted to the peripheral area of the display screen. The etched portion is not illustrated in the drawing.

Next, a second transparent conductive film such as Indium Tin Oxide (ITO) is formed with a thickness of 40 nm by sputtering, and is patterned with the second electrode 29, the electrode 29a, the third electrode 30 and the electrode 30a. In the procedure, the first source electrode 19 and the electrode 29a are electrically connected, and the second source electrode 21 and the electrode 30a are electrically connected. An alignment film 33 is applied to the TFT substrate fabricated as described above, except for the terminals extracted to the peripheral area of the display screen. As the second electrode 29 and the third electrode 30 are formed on the same insulating film, the number of manufacturing steps is smaller compared to the case where the second electrode 29 and the third electrode 30 are formed on different insulating films.

Meanwhile, on the second transparent insulating substrate 34, a black matrix 35, a color layer 36 which is to be a color filter consisting of three colors of red (R), green (G) and blue (B), an overcoat 37 and a columnar spacer (not depicted) for securing a space between the TFT substrate and the opposing substrate are arranged. Furthermore, the alignment film 38 is applied thereon and is baked.

Subsequently, rubbing is performed on the alignment films 33 and 38 of both substrates at an appropriate angle with respect to the direction in which the second electrode 29 and the third electrode 30 extend, to set a liquid crystal alignment orientation 39. For example, the liquid crystal alignment orientation 39 is 7° with respect to the extending direction for the second electrode 29 and the third electrode 30. It is noted that the technique of setting the liquid crystal alignment orientation 39 is not limited to a rubbing process but may also be a photo alignment process by polarized light.

Next, the substrates are bonded to each other such that the alignment films 33 and 38 are opposed to each other, the circumferential parts thereof are fixed by sealing, and the liquid crystal 40 is injected between the substrates which are then sealed. As an example, the liquid crystal cell gap is formed to have the width of 3.5 μm, and the liquid crystal 40 with the refractive index anisotropy of Δn=0.085 and the dielectric anisotropy of Δ∈=6.9 is used. When injecting liquid crystal 40, sufficient injection time is spared so that the liquid crystal 40 is injected thoroughly into the gap between the substrates. Furthermore, pressure is so applied that the inside of the liquid crystal cell has a predetermined pressure, while the substrates are sealed. It is also possible to use a liquid crystal dropping technique to perform, after rubbing of the substrates, manufacturing steps of filling the gap between the substrates with the liquid crystal 40, bonding the substrates to each other, and sealing the peripheral parts in this order. As described above, a liquid crystal display panel including a TFT substrate, a liquid crystal layer and an opposing substrate is fabricated.

A polarization plate 41, with a polarization axis corresponding to the liquid crystal alignment orientation 39 which is the rubbing direction of liquid crystal, is bonded to the TFT substrate included in the liquid crystal display panel, and a polarization plate 42 is bonded to the opposing substrate so as to be arranged in a relation of crossed Nicol. This state is a so-called "normally black mode." Finally, a necessary driver is mounted to the peripheral part, a backlight and a signal processing substrate are assembled in a suitable form, so as to manufacture a liquid crystal display apparatus of the active matrix type.

This liquid crystal display apparatus is of the FFS mode, and an electric field with components parallel to the substrate is generated by the potential difference occurring between the first electrode 26 and the second electrode 29 and by the potential difference occurring between the first electrode 26 and the third electrode 30, and the liquid crystal molecules homogeneously oriented with respect to the liquid crystal alignment orientation 39 are twisted to the in-plane direction, to control the amount of light transmission for each subpixel.

In the present Embodiment 1, the resolution of 640×480 (VGA) is used. The pixel size is set as 150 μm, the width of the data line 12 is set as 5 μm, the width of the second electrode 29 and the third electrode 30 is set as 3 μm, and the distance between the second electrode 29 and the third electrode 30 is set as 5 μm. Furthermore, as illustrated in FIG. 7, three second electrodes 29 and two third electrodes 30 are employed, which are alternately arranged. Though the number of the second electrodes 29 is one larger than that of the third electrodes 30, it is not limited thereto as long as the second electrode 29 and the third electrode 30 are alternately arranged.

Figure 9:
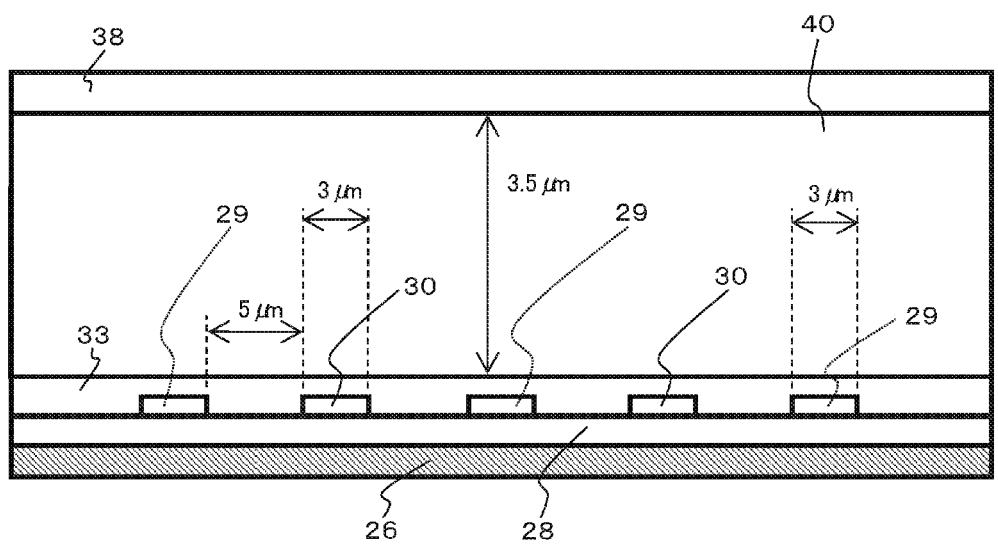
FIG. 9 is a cross-section view of a simulation model corresponding to the cross section along the line II-II in FIG. 7.

A method of driving the liquid crystal display apparatus according to the present embodiment will now be described. First, the result of simulation for the voltage dependency of the transmittance of the light from the backlight will be described. FIG. 9 is a cross-section view of a simulation model corresponding to the cross section along the line II-II in FIG. 7. In FIG. 9, a portion in the TFT substrate located farther from the liquid crystal 40 than the third insulating film 28 and a portion in the opposing substrate located farther from the liquid crystal 40 than the alignment film 38 are not depicted. The first electrode 26 is supplied with the reference fixed potential Vcom from the common wiring 15, the second electrode 29 is driven by the first active element 23, and the third electrode 30 is driven by the second active element 24. In the description below, the driving potentials applied respectively to the second electrode 29 and the third electrode 30 are regarded as absolute values varied from the reference fixed potential Vcom. The driving potential exceeding 0 corresponds to a voltage applied between the first electrode 26 and the second electrode 29 or the third electrode 30.

Figure 10:
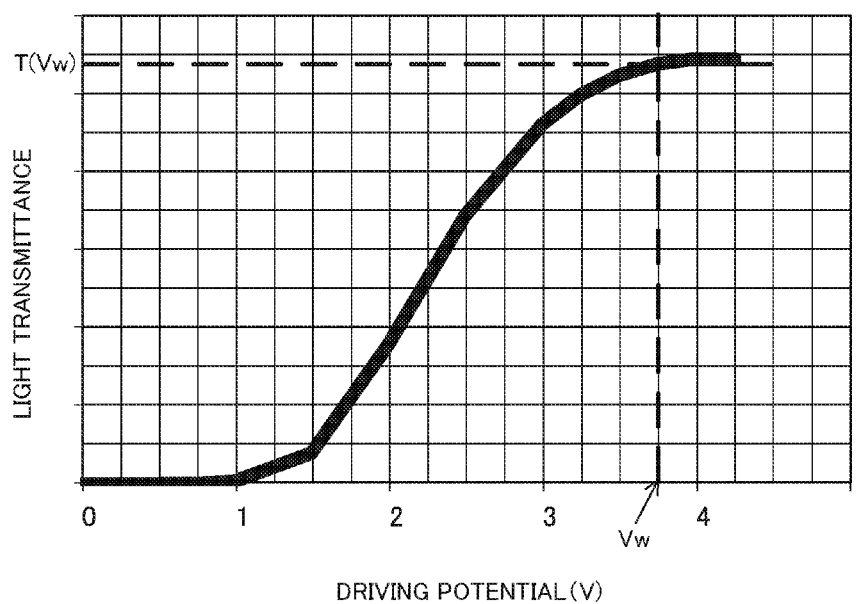
FIG. 10 is a characteristic view illustrating the result of simulation of the potential-transmittance characteristic in the case where a driving potential of the same magnitude is applied simultaneously to the second electrode and the third electrode.

FIG. 10 is a characteristic view illustrating the result of simulation of the potential-transmittance characteristic in the case where a driving potential of the same magnitude is applied simultaneously to the second electrode 29 and the third electrode 30. The horizontal axis indicates a driving potential simultaneously applied to the second electrode 29 and the third electrode 30, whereas the vertical axis indicates the light transmittance in the liquid crystal display panel. The light transmittance simply rises in accordance with the driving potential. Such driving may be assumed to be the same as the driving in the general FFS mode. The light transmittance is largest at the driving potential of approximately 4V. In practice, it is general to set the driving potential Vw, which is smaller by a few tenths of 1V than the driving potential at which the light transmittance is largest, as the potential for the highest gradation level. Here, the light transmittance at the driving potential Vw is referred to as T(Vw).

Figure 11:
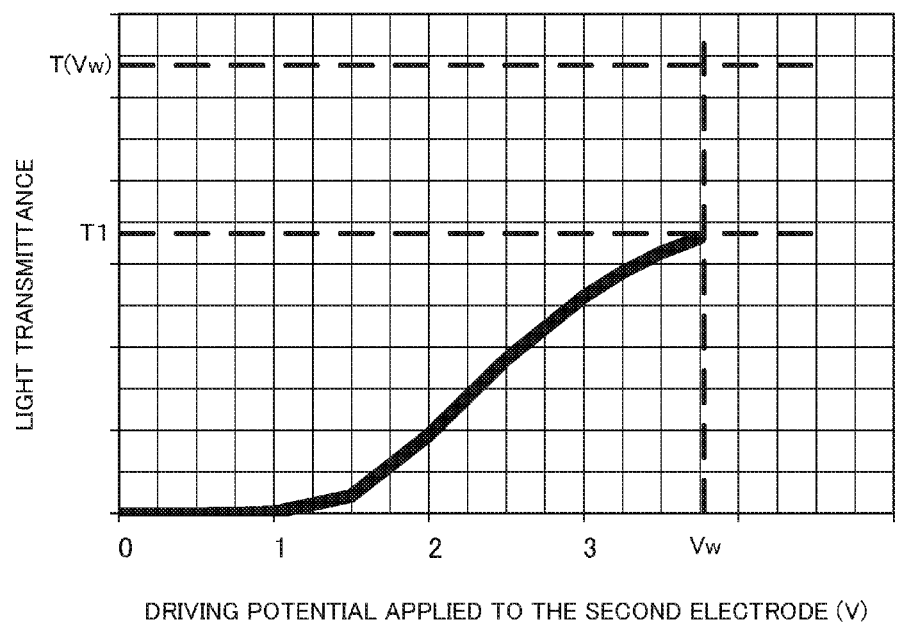
FIG. 11 is a characteristic view illustrating the result of simulation of the potential-transmittance characteristic in the case where a driving potential in the range of 0 to Vw is applied to the second electrode and a fixed reference potential Vcom is applied to the third electrode.

FIG. 11 is a characteristic view illustrating the result of simulation of the potential-transmittance characteristic in the case where a driving potential in the range of 0 to Vw is applied to the second electrode 29 and a fixed reference potential Vcom is applied to the third electrode 30. The horizontal axis indicates a driving potential applied to the second electrode 29. Here, there is no potential difference between the first electrode 26 and the third electrode 30, and no fringe electric field is generated. The light transmittance at the driving potential Vw is slightly more than 60% of T(Vw). The light transmittance here is assumed as T1.

Figure 12:
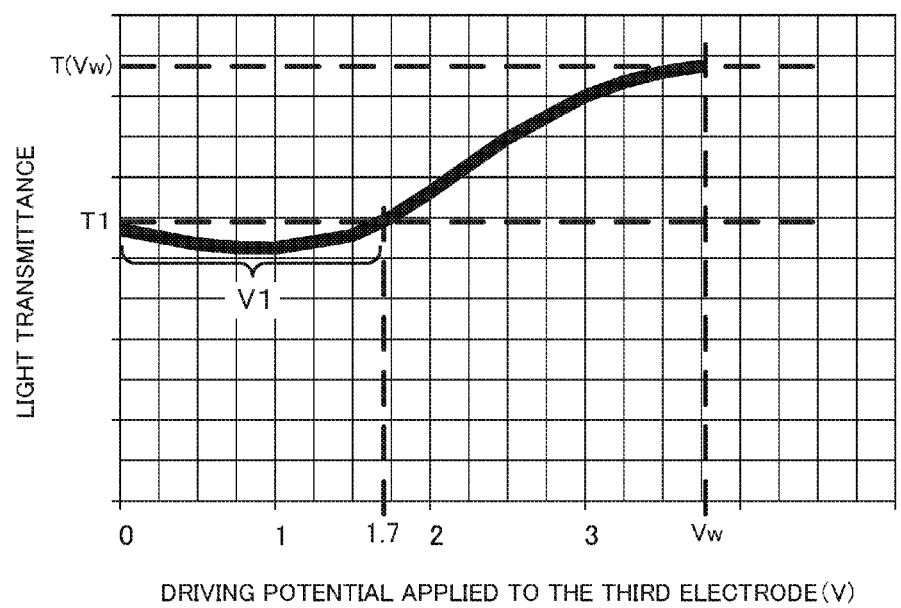
FIG. 12 is a characteristic view illustrating the result of simulation of the potential-transmittance characteristic in the case where a fixed driving potential of Vw is applied to the second electrode and a driving potential in the range of 0 to Vw is applied to the third electrode.

FIG. 12 is a characteristic view illustrating the result of simulation of the potential-transmittance characteristic in the case where a fixed driving potential of Vw is applied to the second electrode 29 and a driving potential in the range of 0 to Vw is applied to the third electrode 30. The horizontal axis indicates a driving potential applied to the third electrode 30. As the driving potential applied to the third electrode 30 increases from 0, the light transmittance is once lowered from T1 and is then raised, reaching T1 at the driving potential of V1 (=1.7V). The light transmittance is further raised in accordance with the increase in the driving potential, reaching T(Vw) at the driving potential of Vw.

Figure 13:
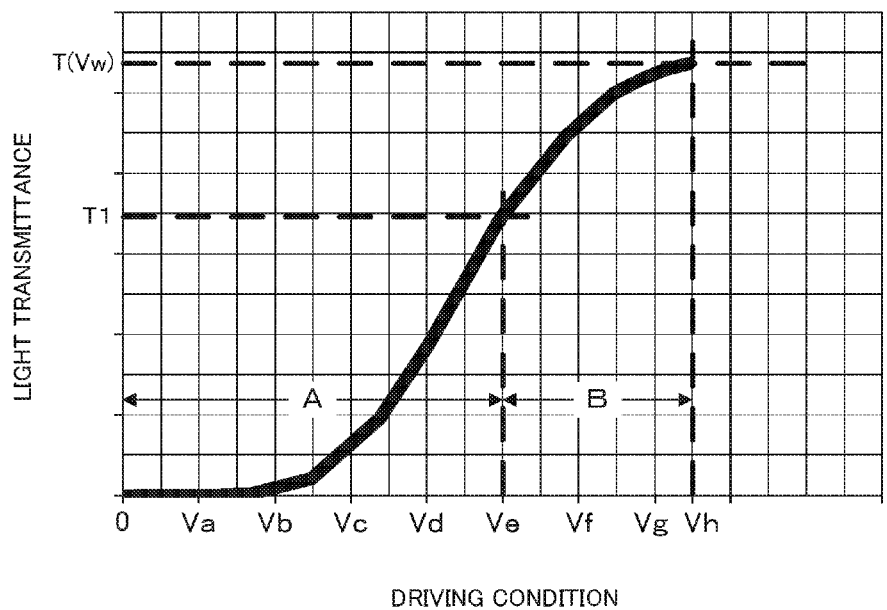
FIG. 13 is a characteristic view illustrating the result of simulation of the potential-transmittance characteristic in the case where driving conditions for the second electrode and the third electrode are optimized.

"The case where the driving potential in the range of 0 to Vw is applied to the second electrode 29 whereas Vcom is applied to the third electrode 30" (A) is combined with "the case where the driving potential of Vw is fixedly applied to the second electrode 29 whereas the driving potential in the range of a value larger than V1 to Vw is applied to the third electrode 30" (B), and the driving conditions for the second electrode 29 and the third electrode 30 are so optimized that the potential-transmittance characteristic is substantially the same as the characteristic as illustrated in FIG. 10. FIG. 13 is a characteristic view illustrating the result of simulation of the potential-transmittance characteristic in the case where driving conditions of the second electrode 29 and the third electrode 30 are optimized. FIG. 14 is a table illustrating the driving conditions for the second electrode 29 and the third electrode 30. The horizontal axis in FIG. 13 corresponds to the driving conditions indicated in FIG. 14.

The condition of (A) described above corresponds to the range of driving conditions 0 to Ve. In the driving conditions 0 to Ve, the reference fixed potential Vcom is applied to the third electrode 30, and the driving potential applied to the second electrode 29 is gradually increased from 0 to Vw. Here, the light transmittance is gradually raised from 0 to T1. The condition of (B) described above corresponds to the range of driving conditions of Ve to Vh. In the driving conditions Ve to Vh, the driving potential applied to the second electrode 29 is fixed at Vw, whereas the driving potential applied to the third electrode 30 is gradually increased from 0 to Vw. Here, the light transmittance is gradually raised from T1 to T(Vw). In accordance with the rise in light transmittance, the luminance of the subpixel is increased.

Accordingly, when the liquid crystal display apparatus is driven under the conditions indicated in FIG. 14, it is possible to prevent the light transmittance from being lowered, which is one of the problems in the prior art. Furthermore, based on the driving conditions, the driving potentials for the second electrode 29 and the third electrode 30 may be determined that are optimal for implementing the gradation display for subpixels. That is, the gradation levels corresponding the light transmittance values 0 to T (Vw) are associated with the driving conditions 0 to Vh as illustrated in FIG. 14 while the potential in accordance with each driving condition is applied to the second electrode 29 and the third electrode 30, so that the subpixel is displayed at the luminance corresponding to each gradation level. Specifically, at the lowest gradation level, the reference fixed potential Vcom is applied to the second electrode 29 and the third electrode 30 and, up to a specific gradation level corresponding to the light transmittance T1, different driving potentials from 0 to Vw are applied to the second electrode 29 in accordance with the gradation levels whereas the reference fixed potential Vcom is applied to the third electrode 30. Furthermore, in the range from the gradation level one higher than the specific gradation level to the highest gradation level corresponding to the light transmittance T(Vw), the driving potential of Vw is applied to the second electrode 29 whereas different driving potentials in the range from a value higher than 0 to Vw are applied to the third electrode 30 in accordance with the gradation levels. In accordance with the driving potential applied to the second electrode 29 and the third electrode 30, the gradation level of the subpixel is determined.

FIG. 15 is a table illustrating another example of the driving conditions for the second electrode 29 and the third electrode 30. As illustrated in FIG. 12, as in the case where the driving potential of the third electrode 30 is 0, the light transmittance is T1 even when the driving potential of the third electrode 30 is V1. Therefore, as illustrated in FIG. 15, as the driving condition Ve for realizing the gradation level corresponding to the light transmittance T1, the driving potential of the third electrode 30 may be set to V1. Under the driving conditions indicated in FIG. 15, in the range from the lowest gradation level to a specific gradation level corresponding to the light transmittance T1, the driving potentials from 0 to Vw are applied to the second electrode 29. As for the third electrode 30, the reference fixed potential Vcom is applied in the range from the lowest gradation level to a gradation level one lower than the specific gradation level. Furthermore, in the range from the specific gradation level corresponding to the light transmittance T1 to the highest gradation level, the driving potential of Vw is applied to the second electrode 29 whereas driving potentials in the range from V1 to Vw are applied to the third electrode 30. As in the case with the driving conditions indicated in FIG. 14, the gradation level of the subpixel is determined in accordance with the driving potential applied to the second electrode 29 and the third electrode 30, so that the gradation display of subpixels may be realized.

A viewing angle characteristic of the liquid crystal display apparatus will now be described. In a liquid crystal display apparatus, no fringe electric field is generated at the third electrode 30 up to approximately 60% of the light transmittance T(Vw) defined as described above, causing the fringe electric field to be generated in a small area and an electric field with components arranged in the direction perpendicular to the substrate to also be generated in a small area within one subpixel. This results in a small area where liquid crystal molecules are deformed in the vertical direction, thereby suppressing deterioration in the viewing angle characteristic of the liquid crystal display apparatus. In addition, the average value of the luminance on a display screen when a general television program is being watched is said to be approximately 30% of the luminance of all white, which is much smaller than 60% as described earlier. This means that an observer can view an image of a television with excellent viewing angle characteristics when the image is displayed on the liquid crystal display apparatus under the driving conditions described earlier.

As such, for the liquid crystal display apparatus according to the present disclosure, the simulation with viewing angle characteristics is carried out. For the display screen of the liquid crystal display apparatus, the light transmittance is simulated for the case where the azimuth is set to 0° or 90°, the polar angle is set to 0°, 20°, 40°, 60° or 80°. Here, the direction of the azimuth 0° corresponds to the horizontal direction in the case where the display screen is vertically oriented, whereas the direction of the azimuth 90° is the vertical direction in the case where the display screen is vertically oriented. The simulation with the viewing angle characteristics is carried out under the condition of a so-called multi-domain structure in which the liquid crystal alignment orientations of +7° and −7° are mixed in the same subpixel, which is the condition for suppressing coloration when viewed from an oblique direction as well as inversion of gradation levels occurring between a black display and a darker medium-tone display so as to obtain more preferable viewing angle characteristics.

Figure 16A:
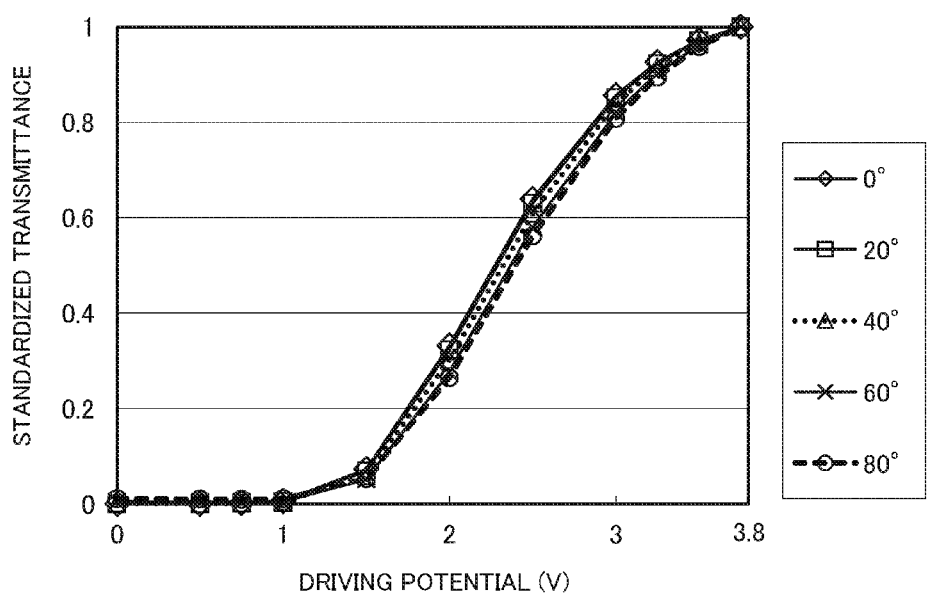
FIG. 16A is a characteristic diagram illustrating the result of simulation for the light transmittance when the azimuth is 0°.
Figure 16B:
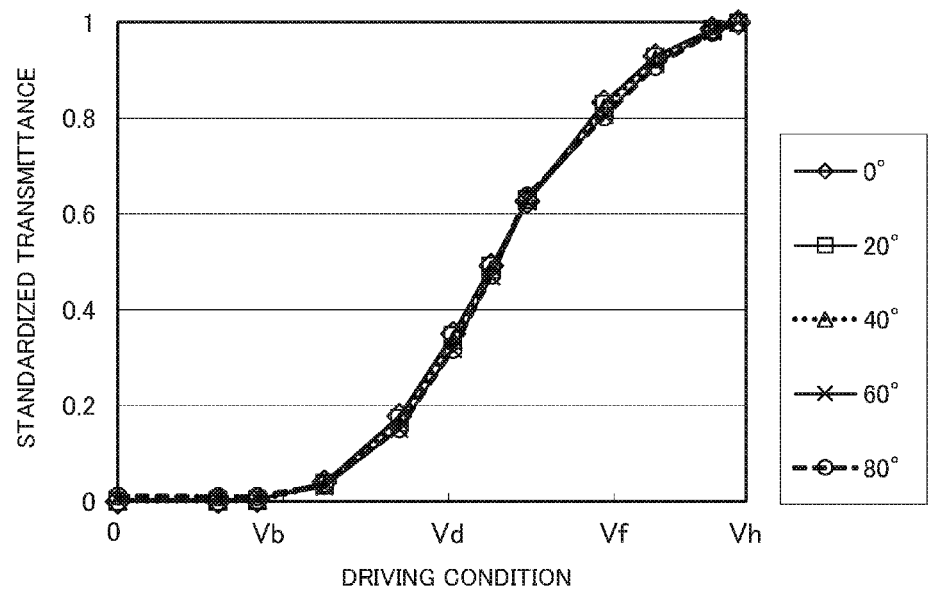
FIG. 16B is a characteristic diagram illustrating the result of simulation for the light transmittance when the azimuth is 0°.

FIGS. 16A and 16B are characteristic diagrams illustrating the results of simulation for the light transmittance when the azimuth is 0°. FIG. 16A illustrates the potential-transmittance characteristic in the case where a driving potential of the same magnitude is applied simultaneously to the second electrode 29 and the third electrode 30, the horizontal axis indicating the driving potential. FIG. 16B illustrates the potential-transmittance characteristic in the case where a driving potential is applied to the second electrode 29 and the third electrode 30 under the driving conditions as illustrated in FIG. 14 or 15, the horizontal axis indicating the driving condition. The vertical axes in FIGS. 16A and 16B indicate the standardized transmittance in which the light transmittance is so standardized as to have the largest value of 1. In FIGS. 16A and 16B, the standardized transmittance values are indicated by diamond, square, triangular, cross and circular markers, respectively, at the polar angles of 0°, 20°, 40°, 60° and 80°. The light transmittance gradually varies in accordance with the change in the polar angle, and the variation in the light transmittance depending on the change in the polar angle indicates the viewing angle characteristic of the liquid crystal display apparatus. The viewing angle characteristic represented in FIG. 16A corresponds to the viewing angle characteristic in the general FFS mode, whereas the viewing angle characteristic represented in FIG. 16B corresponds to the viewing angle characteristic in the present disclosure. Comparing FIG. 16A with FIG. 16B, the variation in the light transmittance depending on the change in the polar angle is smaller in the present disclosure than that in the general FFS mode.

FIGS. 17A and 17B are characteristic diagrams illustrating the results of simulation for the light transmittance when the azimuth is 90°. FIG. 17A illustrates the potential-transmittance characteristic in the case where a driving potential of the same magnitude is applied simultaneously to the second electrode 29 and the third electrode 30, the horizontal axis indicating the driving potential. FIG. 17B illustrates the potential-transmittance characteristic in the case where a driving potential is applied to the second electrode 29 and the third electrode 30 under the driving conditions as illustrated in FIG. 14 or 15, the horizontal axis indicating the driving condition. The vertical axes in FIGS. 17A and 17B illustrate the standardized transmittance. In FIGS. 17A and 17B, the standardized transmittance values are indicated by diamond, square, triangular, cross and circular markers, respectively, at the polar angles of 0°, 20°, 40°, 60° and 80°. Comparing FIG. 17A with FIG. 17B, as in the case with the azimuth of 0°, the variation in the light transmittance depending on the change in the polar angle is smaller in the present disclosure than that in the general FFS mode also in the case with the azimuth of 90°. That is, as illustrated in FIGS. 16A, 16B, 17A and 17B, the liquid crystal display apparatus, in which the structure and driving method proposed in the present application are adopted, has preferable viewing angle characteristics compared to a liquid crystal display apparatus of the general FFS mode.

Figure 19A:
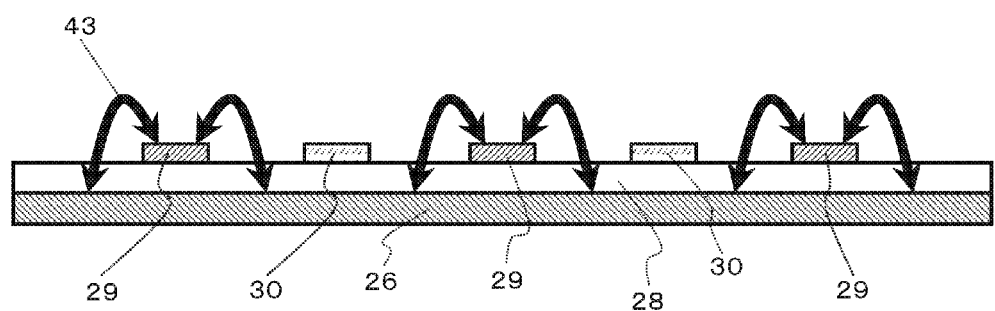
FIG. 19A is a schematic cross-section view illustrating the state of an electric field in the case where the liquid crystal display apparatus is driven under driving conditions Va to Ve illustrated in FIG. 14.
Figure 19B:
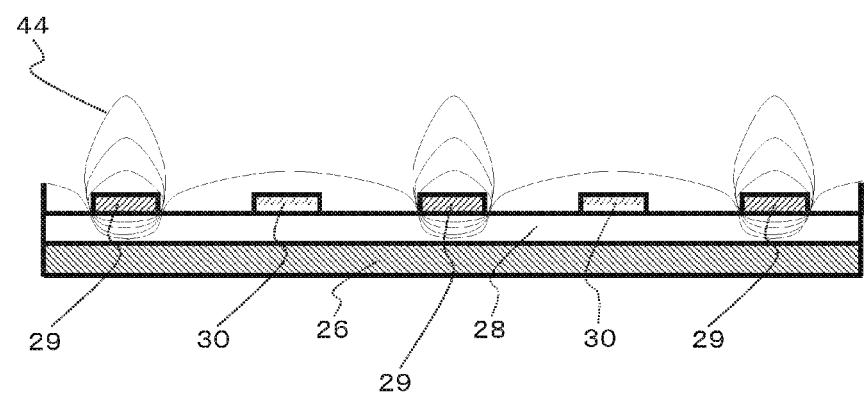
FIG. 19B is a schematic cross-section view illustrating the state of a potential in the case where the liquid crystal display apparatus is driven under the driving conditions Va to Ve illustrated in FIG. 14.

FIG. 18A is a schematic cross-section view illustrating the state of an electric field in the case where a driving potential of the same magnitude is simultaneously applied to the second electrode 29 and the third electrode 30. FIG. 18B is a schematic cross-section view illustrating the state of a potential in the case where a driving potential of the same magnitude is simultaneously applied to the second electrode 29 and the third electrode 30. FIG. 18A illustrates fringe electric fields 43, whereas FIG. 18B illustrates equipotential lines 44. FIG. 19A is a schematic cross-section view illustrating the state of an electric field in the case where the liquid crystal display apparatus is driven under the driving conditions Va to Ve illustrated in FIG. 14. FIG. 19B is a schematic cross-section view illustrating the state of a potential in the case where the liquid crystal display apparatus is driven under the driving conditions Va to Ve illustrated in FIG. 14. FIG. 19A illustrates the fringe electric fields 43, whereas FIG. 19B illustrates the equipotential lines 44. Each of FIGS. 18A, 18B, 19A and 19B illustrates a cross section as illustrated in FIG. 9. The electric field indicated in FIG. 18A and the potential indicated in FIG. 18B correspond to the electric field and potential in a general FFS mode. The electric field indicated in FIG. 19A and the potential indicated in FIG. 19B correspond to the electric field and potential in the present disclosure. Comparing FIG. 18A with FIG. 19A, the region where the fringe electric field is generated is smaller in FIG. 19A, so that the vertical electric field in the direction orthogonal to the substrate is reduced as a whole. Moreover, comparing FIG. 18B with FIG. 19B, the potential curve is less steep in the case of FIG. 19B, which makes the vertical electric field small as a whole. It is presumed that these differences are the cause of the differences in the viewing angle characteristics indicated in FIGS. 16A, 16B, 17A and 17B.

Figure 20:
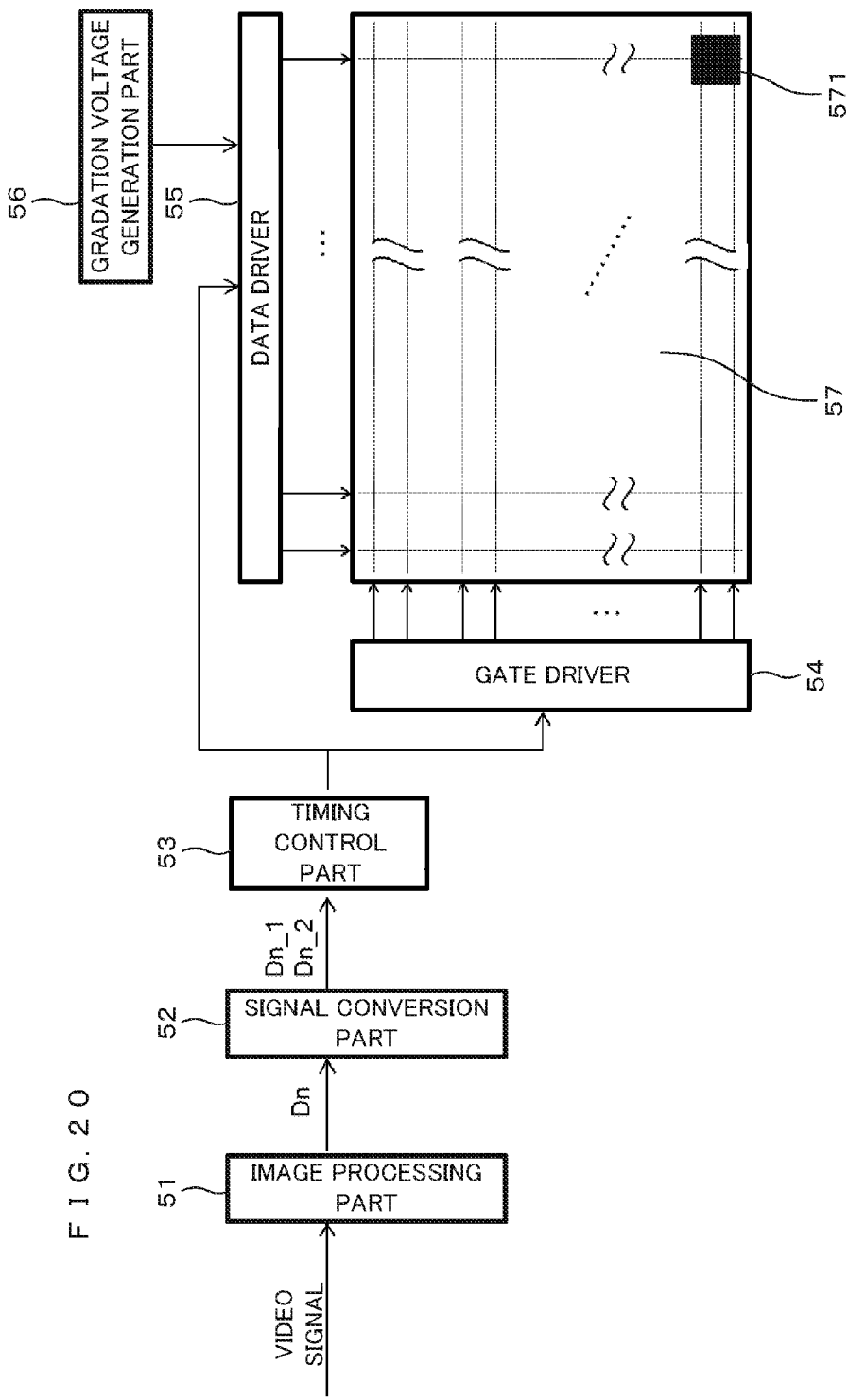
FIG. 20 is a block diagram illustrating the configuration of the liquid crystal display apparatus according to Embodiment 1 of the present disclosure.

FIG. 20 is a block diagram illustrating the configuration of the liquid crystal display apparatus according to Embodiment 1 of the present disclosure. In FIG. 20, a backlight and a mechanism for making the backlight operate are not illustrated. The liquid crystal display apparatus includes a liquid crystal display panel 57, an image processing part 51, a signal conversion part 52, a timing control part 53, a gate driver 54, a data driver 55 and a gradation voltage generation part 56. The liquid crystal display panel 57 is configured to include the TFT substrate, opposing substrate and liquid crystal 40 that were described earlier. The display screen of the liquid crystal display panel 57 is constituted by multiple pixels arranged in matrix, while one pixel is constituted by subpixels of three colors of RGB. A subpixel region 571 in the TFT substrate corresponding to each subpixel has two active elements (TFT), as described above, and is connected to two scanning lines and one data line 12. Multiple scanning lines are connected to the gate driver 54, whereas multiple data lines 12 are connected to the data driver 55.

The image processing part 51 performs predetermined image processing for a video signal input from the outside to create a video signal Dn, and supplies the video signal Dn to the signal conversion part 52. The signal conversion part 52 converts the video signal Dn supplied from the image processing part 51 into two video signals Dn_1 and Dn_2 for each subpixel using a lookup table created and stored in advance based on the driving conditions indicated in FIG. 13, 14 or 15. The signal conversion part 52 supplies video signals to the timing control part 53.

To the first electrode 26, through the common wiring 15, the reference fixed potential Vcom is applied from a power supply unit (not illustrated). The timing control part 53 controls the driving timing for the gate driver 54 and the data driver 55, to supply the video signals Dn_1 and Dn_2 to the data driver 55. The gate driver 54 sequentially supplies a signal to the scanning line in accordance with the timing control by the timing control part 53, to sequentially drive the subpixel regions connected to the scanning lines.

The gradation voltage generation part 56 supplies gradation voltage used in digital/analog conversion for the data driver 55. The data driver 55 creates drive signals based on the video signals Dn_1 and Dn_2 supplied from the timing control part 53 using the gradation voltage supplied from the gradation voltage generation part 56, and supplies the created drive signals to the data lines 12 corresponding to the video signals. Here, the data driver 55 supplies the drive signal corresponding to the video signal Dn_1 to the data line 12 at a timing when the gate driver 54 supplies a signal to the first scanning line 13 among the two scanning lines connected to the subpixel region 571. And the data driver 55 supplies the drive signal corresponding to the video signal Dn_2 to the data line 12 at a timing when the gate driver 54 supplies a signal to the second scanning line 14. As for the video signals Dn, the drive signals based on the video signals Dn_1 and Dn_2 are sequentially supplied to the data line 12, which allows the data driver 55 to supply drive signals to the data line 12 at a frequency twice as much as that in the conventional liquid crystal display apparatus.

In the subpixel region 571, when a signal is supplied to the first scanning line 13, the first active element 23 is turned on, the drive signal based on the video signal Dn_1 is supplied to the first active element 23 through the data line 12, and a driving potential in accordance with the video signal Dn_1 is applied to the second electrode 29. Furthermore, when a signal is supplied to the second scanning line 14, the second active element 24 is turned on, the drive signal based on the video signal Dn_2 is supplied to the second active element 24 through the data line 12, and a driving potential in accordance with the video signal Dn_2 is applied to the third electrode 30. Accordingly, driving potentials are applied to the second electrode 29 and the third electrode 30 substantially at the same time, so that the transmittance of light from the backlight is controlled and the subpixel is displayed.

In the liquid crystal display apparatus according to the present embodiment, therefore, the viewing angle characteristics may be improved without lowering the light transmittance. This allows for a high quality display with small degrading in the image quality even when viewed from an oblique direction with respect to the display screen. In addition, the various set values such as the driving potential as described above are the values employed in Embodiment 1, which are not particularly limited thereto but may be set appropriately.

While the present embodiment described that the liquid crystal display apparatus includes the common wiring 15 formed in the first metal layer, the liquid crystal display apparatus may exclude the common wiring 15. More specifically, since the first electrode 26 is electrically connected between adjacent subpixel regions, the common wiring 15 may be eliminated in such a configuration that the reference potential is applied to the first electrode 26 from the peripheral part of the TFT substrate.

Embodiment 2

Embodiment 1 employs two manufacturing steps of opening contact holes and three manufacturing steps of forming insulating films. Embodiment 2 employs one manufacturing step of opening a contact hole and two manufacturing steps of forming insulating films.

Figure 21:
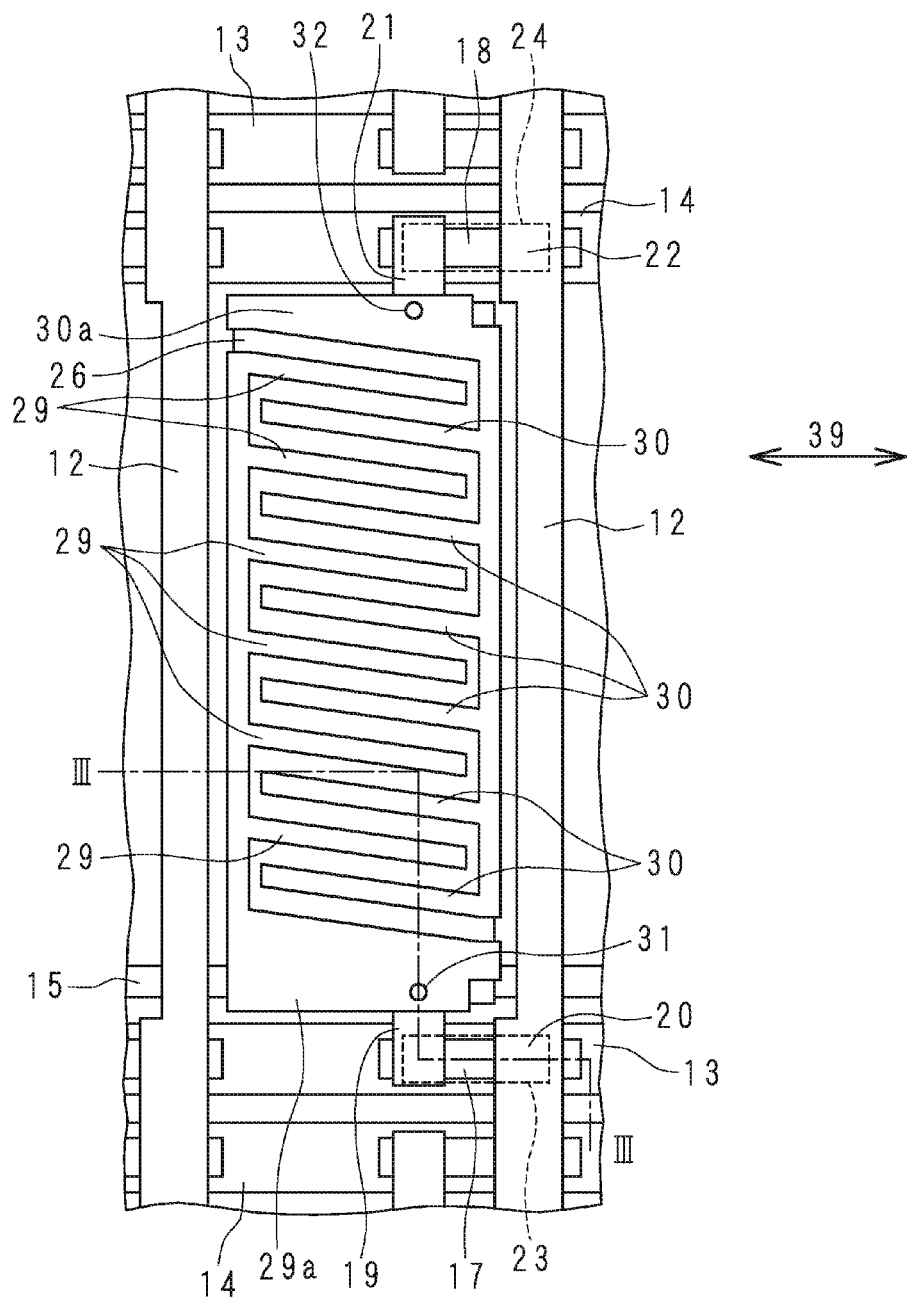
FIG. 21 is a front view illustrating the configuration for one subpixel of the liquid crystal display apparatus according to Embodiment 2 of the present disclosure.
Figure 22:
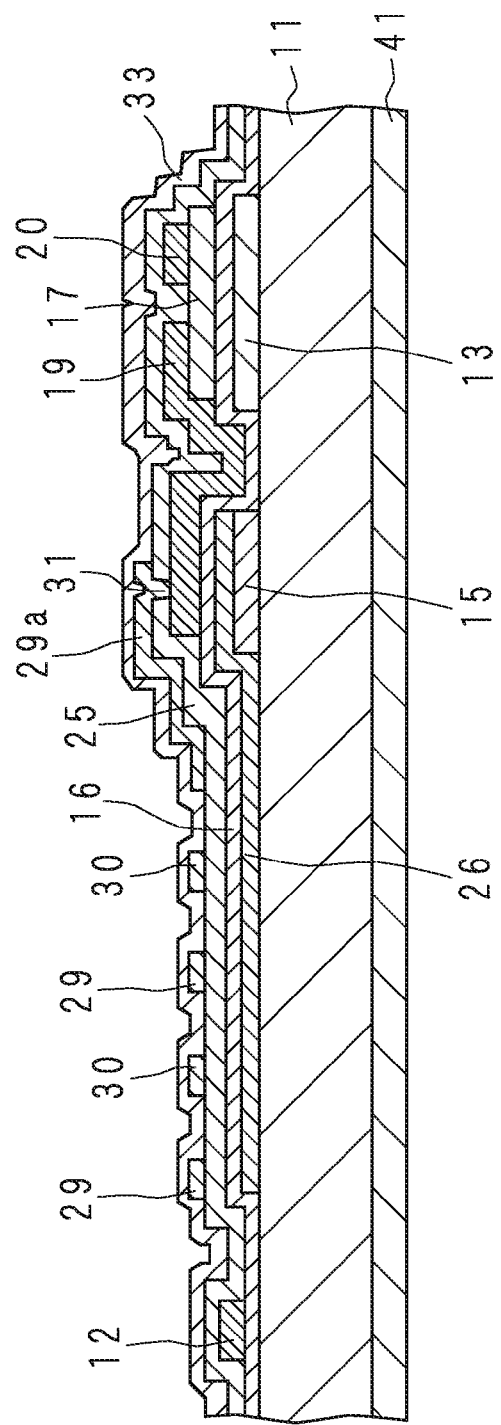
FIG. 22 is a cross-section view along the line III-III in FIG. 21.

FIG. 21 is a front view illustrating the configuration for one subpixel of the liquid crystal display apparatus according to Embodiment 2 of the present disclosure. FIG. 22 is a cross-section view along the line III-III in FIG. 21. In FIG. 22, a liquid crystal layer as well as an opposing substrate are not illustrated. Embodiment 2 illustrated in FIGS. 21 and 22 will be described below in detail.

Subpixel regions corresponding to a plurality of subpixels are provided in matrix on the first transparent insulating substrate 11, each subpixel region being enclosed by two adjacent data lines 12, a first scanning line 13 and a second scanning line 14. The first scanning line 13, the second scanning line 14 and a common wiring 15 are arranged in the same layer on the first transparent insulating substrate 11. The first electrode 26 is arranged in a solid manner so as to be included within the opening region of the subpixel region.

Furthermore, a part of the first electrode 26 is overlapped with the common wiring 15, and is electrically connected to the common wiring 15. The first electrode 26 is formed of a transparent conductive film such as ITO.

On the first insulating film 16, a first semiconductor layer 17 is arranged like an island above the first scanning line 13, while a second semiconductor layer 18 is arranged like an island above the second scanning line 14. Furthermore, a data line 12, a first source electrode 19, a first drain electrode 20, a second source electrode 21 and a second drain electrode 22 are arranged. The first drain electrode 20 and the second drain electrode 22 constitute a part of the data line 12. The first active element 23 is constituted with the first scanning line 13 set as a gate electrode while including the first semiconductor layer 17, the first source electrode 19 and the first drain electrode 20. The second active element 24 is constituted with the second scanning line 14 set as a gate electrode while including the second semiconductor layer 18, the second source electrode 21 and the second drain electrode 22.

On the second insulating film 25, multiple second electrodes 29 and third electrodes 30 are arranged in the same layer. The second electrode 29 and the third electrode 30 are linear and are alternately arranged in parallel with one another in the front view. The second electrodes 29 are connected to an electrode 29a at one end in the subpixel region. The third electrodes 30 are connected to an electrode 30a at the other end in the subpixel region. Though the number of the second electrodes 29 is the same as that of the third electrodes 30, it is not limited thereto as long as the second electrode 29 and the third electrode 30 are alternately arranged. The electrode 29a is electrically connected to the first source electrode 19 through the second contact hole 31 opened in the second insulating film 25. The electrode 30a is electrically connected to the second source electrode 21 through the third contact hole 32 opened in the second insulating film 25.

Furthermore, as illustrated in FIG. 21, in Embodiment 2, the extending direction of the second electrode 29 and the third electrode 30 is inclined by 7° with respect to the extending direction of the scanning line, while the liquid crystal alignment orientation 39 is set substantially the same as the extending direction of the scanning line. In Embodiment 1, since the data line 12 is covered solidly by the first electrode 26 to which the reference fixed potential Vcom is applied with the second insulating film 25 intervening therebetween, the data line 12 is shielded by the first electrode 26, preventing the electric filed generated from the data line 12 from leaking to the liquid crystal 40. In Embodiment 2, on the other hand, no electrode for shielding the electric field is present over the data line 12. As the extending direction of the second electrode 29 and the third electrode 30 as well as the liquid crystal alignment orientation 39 are defined as described earlier, the direction of an electric field generated between the data line 12 and the first electrode 26, the second electrode 29 and the third electrode 30 is matched with the liquid crystal alignment orientation 39 so that the liquid crystal 40 in the periphery of the data line 12 is not rotated (twisted and deformed).

In Embodiment 2, therefore, the manufacturing steps for the first contact hole 27 and the third insulating film 28 as described in Embodiment 1 may be eliminated, thereby reducing the number of manufacturing steps as well as the manufacturing cost. The liquid crystal display apparatus according to Embodiment 2 operates similarly to the liquid crystal display apparatus according to Embodiment 1, producing a similar effect. While the present embodiment illustrated the form where the first electrode 26 is arranged after the first scanning line 13, the second scanning line 14 and the common wiring 15 are arranged in the same layer, the order of the layers may also be reversed.

Embodiment 3

In Embodiments 1 and 2, the second electrode 29 and the third electrode 30 are arranged on the same insulating film by the same manufacturing steps. In Embodiment 3, either one of the manufacturing steps in Embodiment 1 and Embodiment 2 may be employed until the second electrode 29 is arranged, and thereafter, i.e. after the second electrode 29 is arranged, a fourth insulating film 45 is formed, and the third electrode 30 is arranged after a fourth contact hole 46 is opened.

Figure 23:
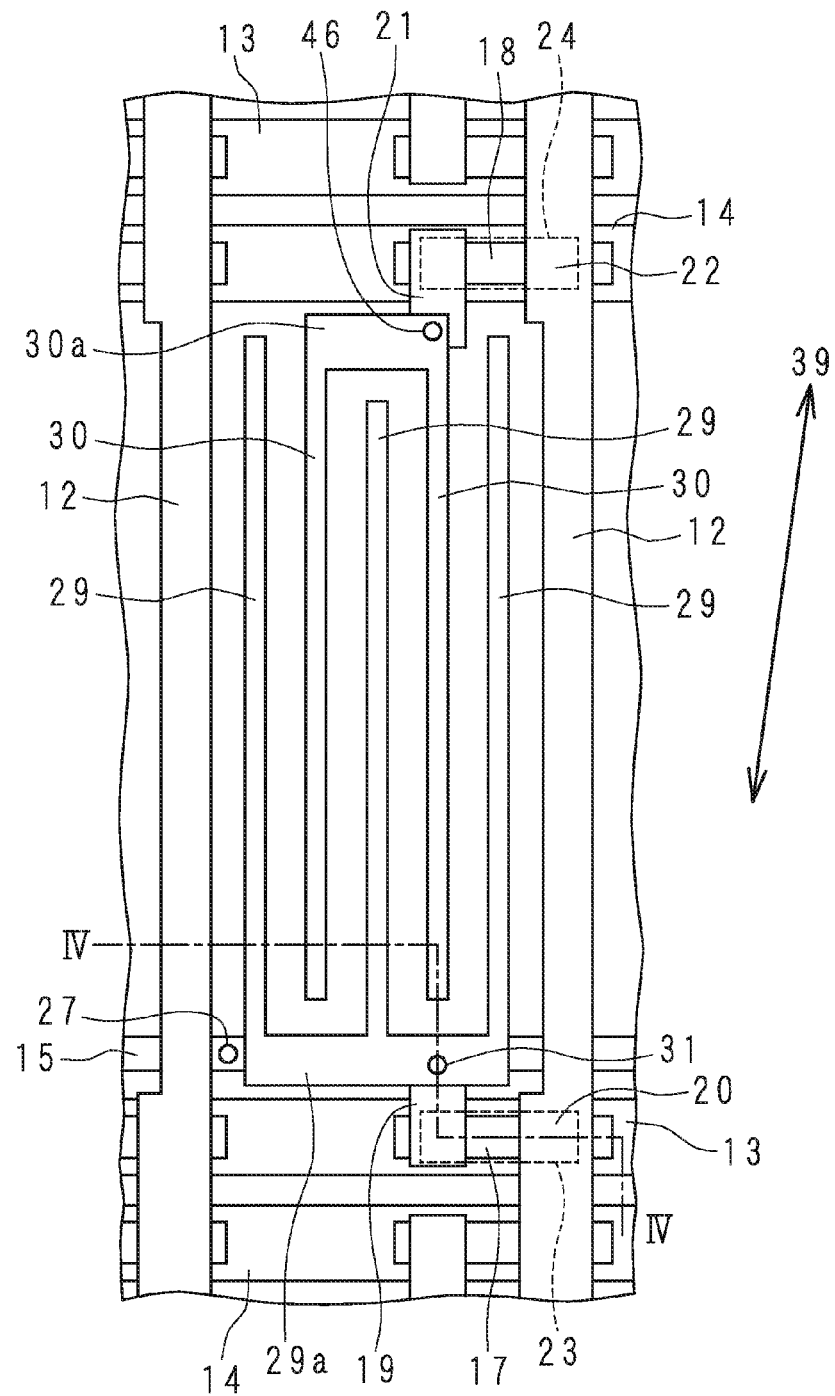
FIG. 23 is a front view illustrating the configuration for one subpixel of the liquid crystal display apparatus according to Embodiment 3 of the present disclosure.
Figure 24:
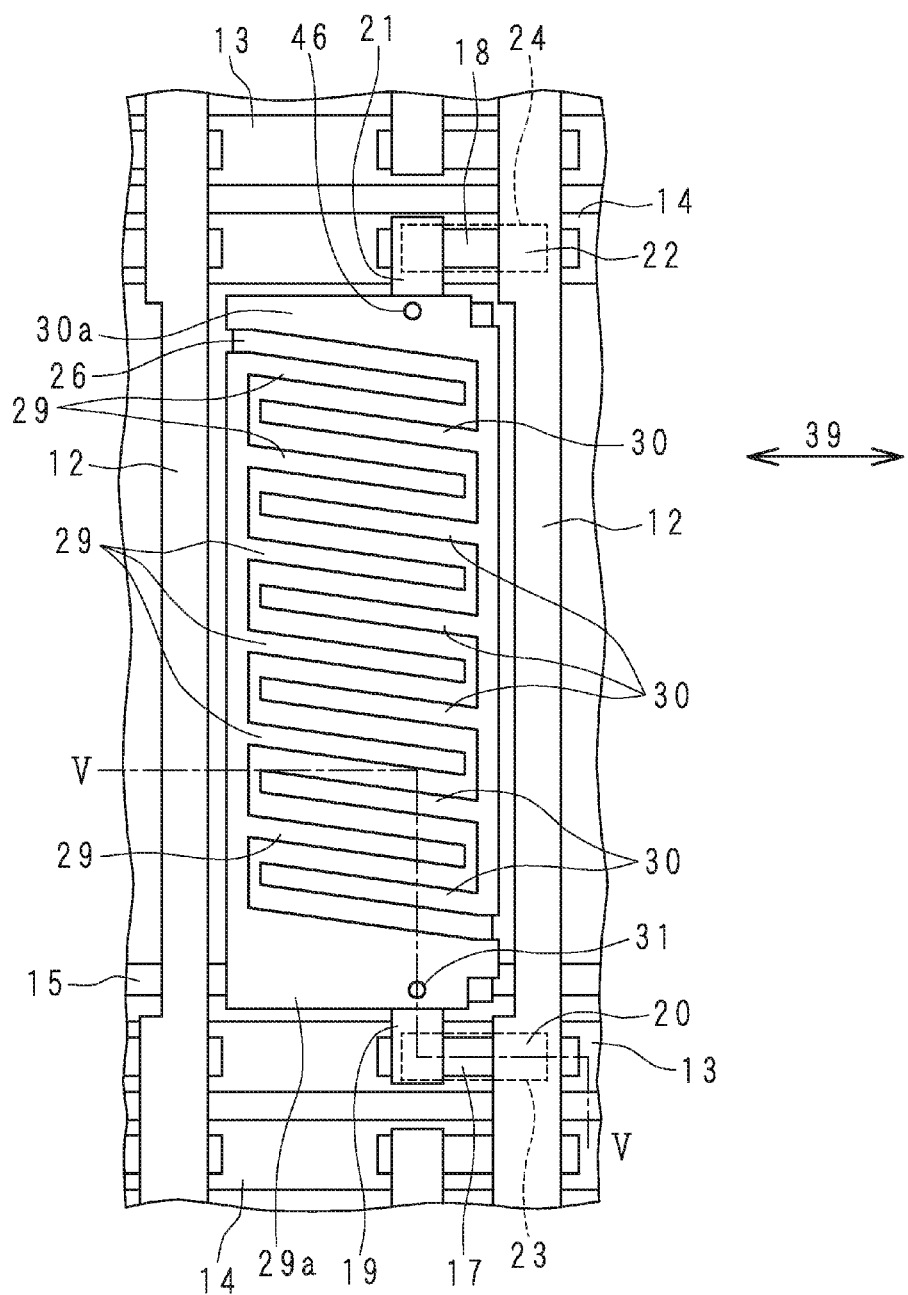
FIG. 24 is a front view illustrating the configuration for one subpixel of the liquid crystal display apparatus according to Embodiment 3 of the present disclosure.
Figure 25:
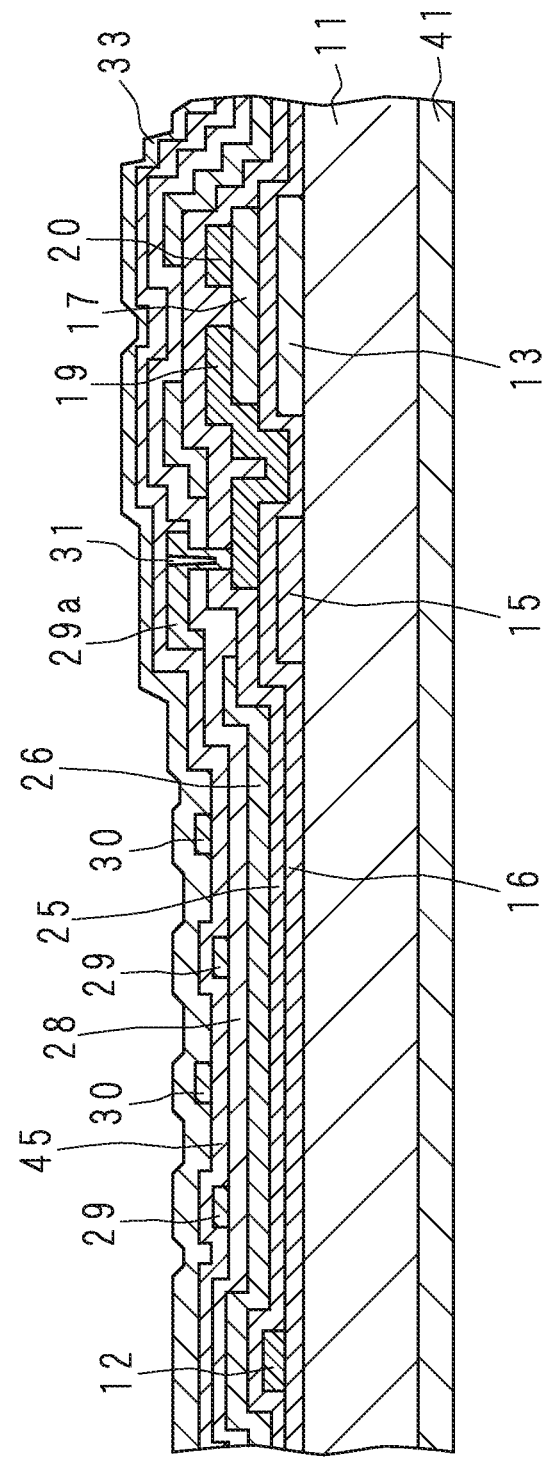
FIG. 25 is a cross-section view along the line IV-IV in FIG. 23.
Figure 26:
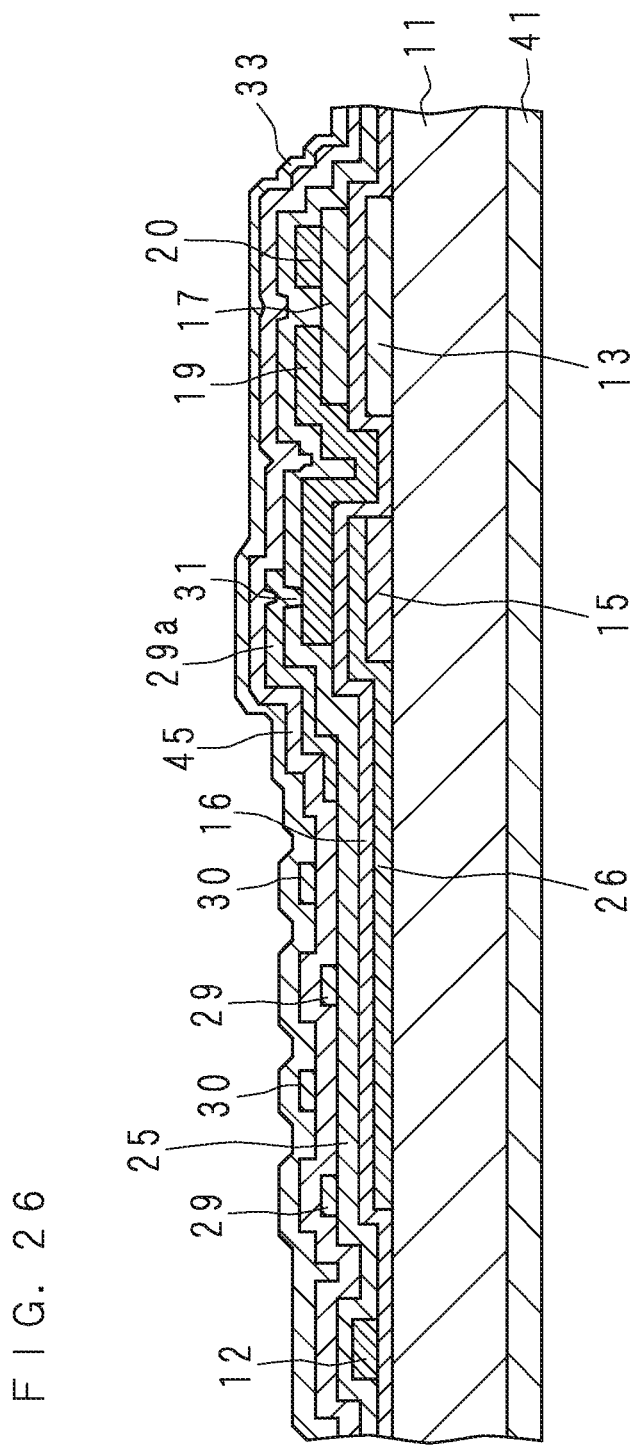
FIG. 26 is a cross-section view along the line V-V in FIG. 24.

FIGS. 23 and 24 are front views illustrating the configuration for one subpixel of the liquid crystal display apparatus according to Embodiment 3 of the present disclosure. FIG. 23 illustrates the structure in which the manufacturing steps for the liquid crystal display apparatus are similar to those in Embodiment 1 up to a partway, whereas FIG. 24 illustrates the structure in which the manufacturing steps for the liquid crystal display apparatus are similar to those in Embodiment 2 up to a partway. FIG. 25 is a cross-section view along the line IV-IV in FIG. 23. FIG. 26 is a cross-section view along the line V-V in FIG. 24. In FIGS. 25 and 26, a liquid crystal layer as well as an opposing substrate are not illustrated. The second electrode 29 and the third electrode 30 are arranged on different insulating films and are separated from each other by the fourth insulating film 45.

In the manufacturing step of opening the fourth contact hole 46, a portion of the insulating film is removed by etching so as to expose a metal layer at terminals of the first scanning line 13, the second scanning line 14 and the data line 12 extracted to the peripheral area of the TFT substrate. In the case where the manufacturing steps for the liquid crystal display apparatus is similar to those in Embodiment 1 up to a partway, portions of the first insulating film 16, the second insulating film 25, the third insulating film 28 and the fourth insulating film 45 are removed by etching. Furthermore, in the case where the manufacturing steps for the liquid crystal display apparatus are similar to those in Embodiment 2 up to a partway, portions of the first insulating film 16, the second insulating film 25 and the fourth insulating film 45 are removed by etching.

Accordingly, in Embodiment 3, the second electrode 29 and the third electrode 30 may be prevented from being short-circuited, thereby improving the yield at the time of manufacturing the liquid crystal display apparatus. Moreover, since a possibility of short-circuiting is eliminated, the design constraint for maintaining the distance between the second electrode 29 and the third electrode 30 may be alleviated.

While the present embodiment illustrated an example where the second electrode 29 is formed on the third insulating film 28 or the second insulating film 25 whereas the third electrode 30 is formed on the fourth insulating film 45, the liquid crystal display apparatus may also take a form in which the third electrode 30 is formed on the third insulating film 28 or the second insulating film 25 whereas the second electrode 29 is formed on the fourth insulating film 45.

Embodiment 4

According to Embodiment 4, in a subpixel region of a TFT substrate, the storage capacitance formed by the first electrode 26 as well as the second electrode 29 and the electrode 29a is substantially the same as the storage capacitance formed by the first electrode 26 as well as the third electrode 30 and the electrode 30a. More preferably, the capacitance parasitic to the first active element 23 is substantially the same as the capacitance parasitic to the second active element 24.

For example, in the case of Embodiment 1, as illustrated in FIG. 7, the total area of the second electrode 29 and the electrode 29a as well as the total area of the third electrode 30 and the electrode 30a that are arranged above the first electrode 26 are designed to be substantially equal to each other, so as to obtain substantially the same storage capacitance. Moreover, in the case of Embodiment 2, as illustrated in FIG. 21, the total area of the second electrode 29 and the electrode 29a as well as the total area of the third electrode 30 and the electrode 30a that are arranged above the first electrode 26 and the common wiring 15 are designed to be substantially equal to each other, so as to obtain substantially the same storage capacitance. Furthermore, in the case of Embodiment 3, as the distance from the first electrode 26 to the second electrode 29 and the electrode 29a is different from the distance from the first electrode 26 to the third electrode 30 and the electrode 30a, a value obtained by dividing each area by each distance is designed to be substantially equal, so as to obtain substantially the same storage capacitance.

Furthermore, the first active element 23 and the second active element 24 are formed to have substantially the same dimension while the area where the first scanning line 13 overlaps with the first source electrode 19 is arranged to be substantially the same as the area where the second scanning line 14 overlaps with the second source electrode 21, so as to obtain substantially the same parasitic capacitance.

In the case where the storage capacitances or the parasitic capacitances described above are different, the values of the feed-through voltage generated in the second electrode 29 and the third electrode 30 are different from each other, resulting in different optimal reference potentials. Here, the second electrode 29 and the third electrode 30 make the liquid crystal 40 move differently in accordance with the same potential, which causes deterioration in the image quality. According to Embodiment 4, since the storage capacitances or the parasitic capacitances are substantially the same, the feed-through voltage for the second electrode 29 and the third electrode 30 within the same subpixel region is substantially the same, which prevents the liquid crystal 40 from being unintentionally driven in the subpixel region, thereby not deteriorating the display quality.

Embodiment 5

Figure 27:
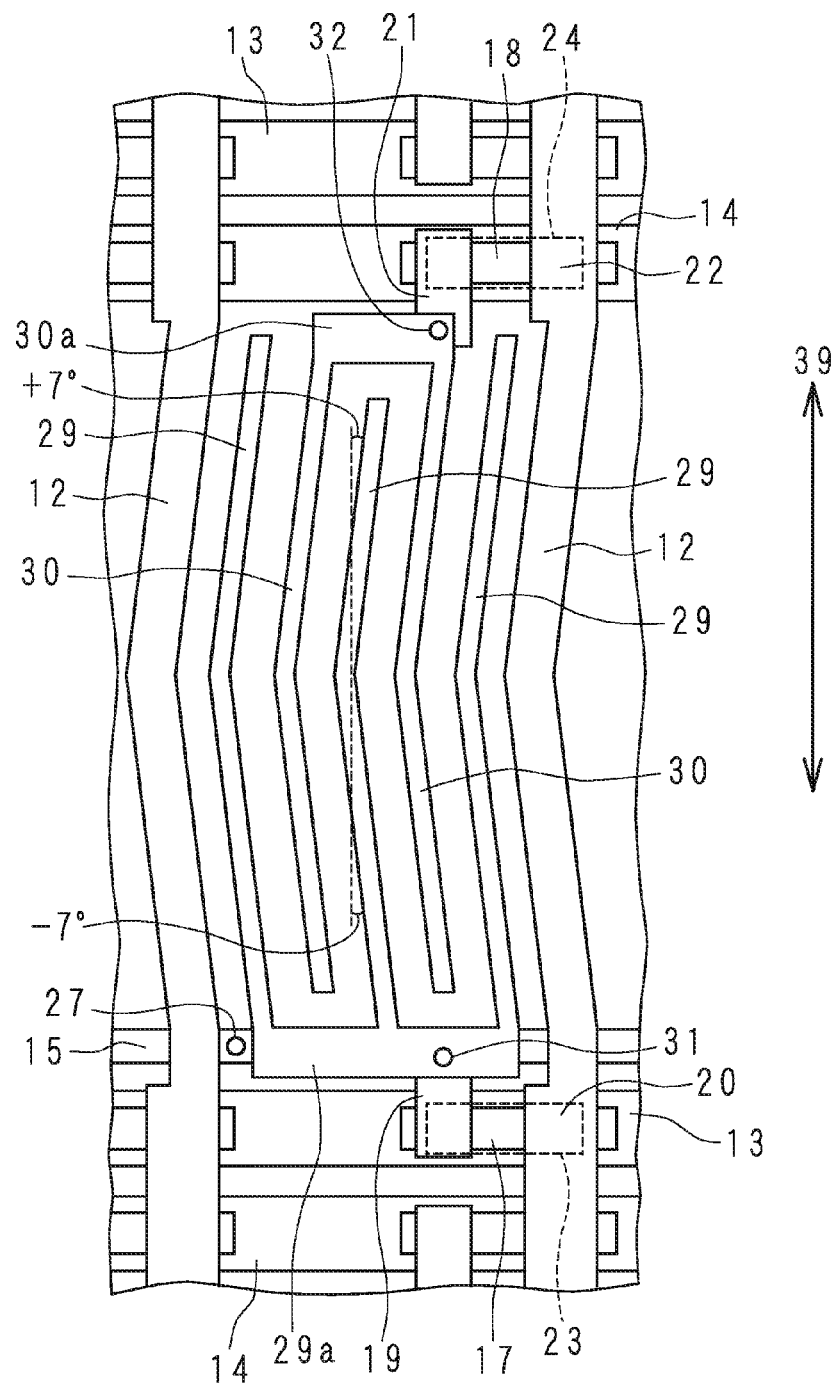
FIG. 27 is a front view illustrating the configuration for one subpixel of the liquid crystal display apparatus according to Embodiment 5 of the present disclosure.
Figure 28:
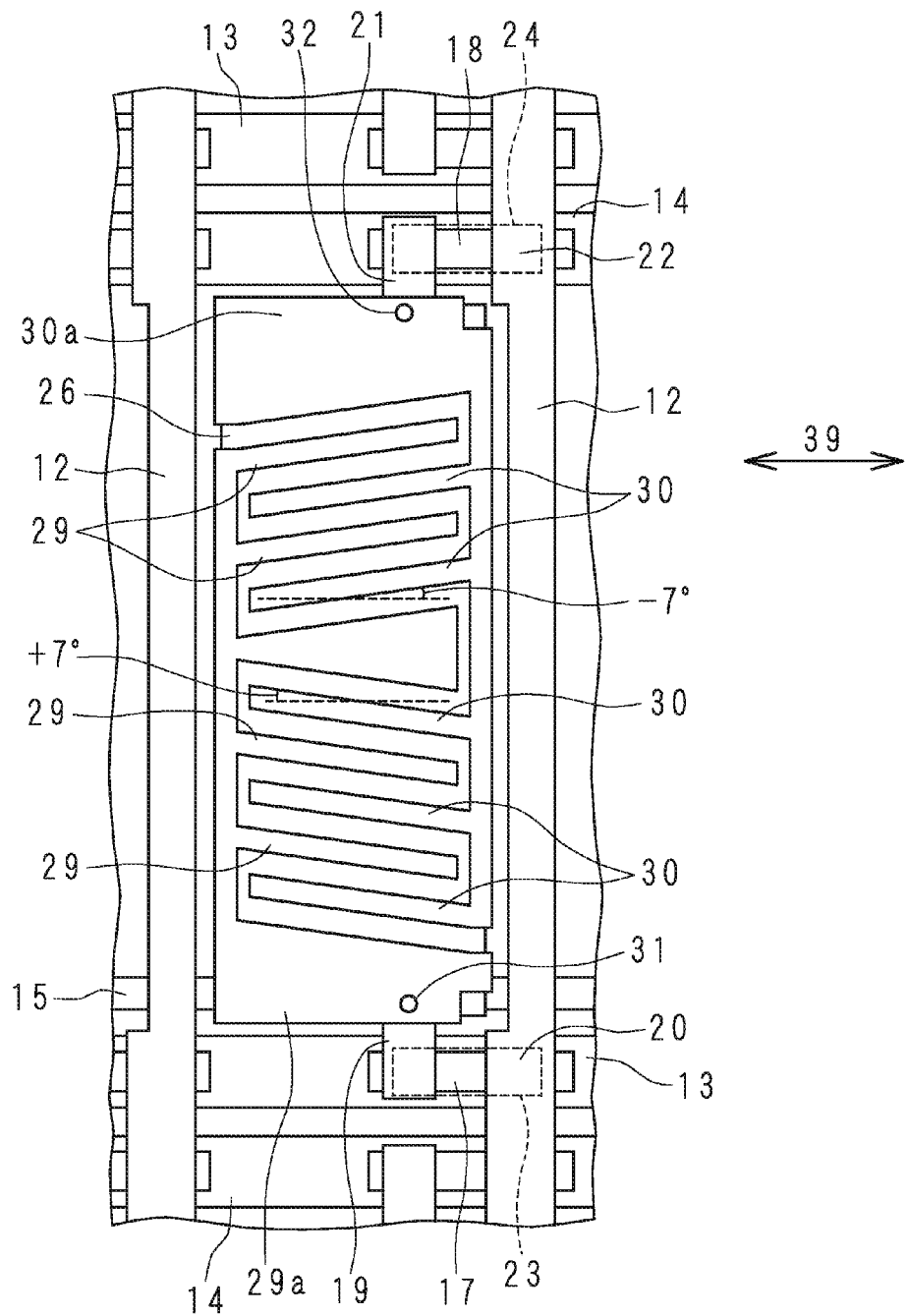
FIG. 28 is a front view illustrating the configuration for one subpixel of the liquid crystal display apparatus according to Embodiment 5 of the present disclosure.

In Embodiment 5, a so-called multi-domain structure is employed in which the second electrode 29 and the third electrode 30 extend in two different directions in the subpixel region. FIGS. 27 and 28 are front views illustrating the configuration for one subpixel of the liquid crystal display apparatus according to Embodiment 5 of the present disclosure. FIG. 27 illustrates a configuration example where, in a configuration similar to Embodiment 1, the liquid crystal alignment orientation 39 corresponds to a direction orthogonal to the scanning line and the subpixel region is so bent that the extending direction of the second electrode 29, the third electrode 30 and the data line 12 is inclined by ±7° with respect to the direction orthogonal to the scanning line. Moreover, FIG. 28 illustrates a configuration example where, in a configuration similar to Embodiment 2, the liquid crystal alignment orientation 39 corresponds to the same direction as the extending direction of the scanning line and the second electrode 29 and the third electrode 30 are so arranged that the extending direction of the second electrode 29 and the third electrode 29 is inclined by ±7° with respect to the scanning line. The liquid crystal display apparatus according to Embodiment 5 may also take a form of, as in Embodiment 3, including the fourth insulating film 45 and the fourth contact hole 46 which is formed instead of the third contact hole 32.

Accordingly, in the liquid crystal display apparatus according to Embodiment 5, within one subpixel region, the region where the extending direction of the second electrode 29 and the third electrode 30 with respect to the liquid crystal alignment orientation 39 is inclined by +7° with respect to the liquid crystal alignment orientation 39 and the region where it is inclined by −7° optically compensate each other. This suppresses coloration when viewed from an oblique direction with respect to the display screen as well as gradation inversion occurring between a black display and a darker medium-tone display, allowing a more preferable viewing angle characteristic to be obtained.

While Embodiments 1 to 5 illustrated examples where multiple second electrodes 29 and third electrodes 30 are included in one subpixel region, a liquid crystal display apparatus having a single second electrode 29 or third electrode 30 in one subpixel region may also be employed. Moreover, Embodiments 1 to 5 illustrated examples where the active element is a TFT, the liquid crystal display apparatus may also include an active element other than TFT.

While the present disclosure has been described above with reference to different embodiments, it is not limited to the embodiments described above. Various modifications that can be understood by a person with ordinary skills in the art may also be added to the configuration and details of the present disclosure. The present disclosure also encompasses an appropriate combination of a part or whole of the configurations in different embodiments.

The present disclosure may be applicable to a liquid crystal display apparatus of an active matrix type in the FFS mode, and to any equipment employing the liquid crystal display apparatus as a display device.

According to the present application, in the liquid crystal display apparatus of the FFS mode, the light transmittance is not lowered while the viewing angle characteristics are further improved, allowing for a high quality display with small degrading in the image quality even when viewed from an oblique direction with respect to the display screen.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A liquid crystal display apparatus, comprising:
a pair of substrates;
liquid crystal held between the pair of substrates;
a plurality of scanning lines arranged on one substrate of the pair of substrates;
a plurality of data lines arranged on the one substrate so as to cross the scanning lines;
a transparent and planar first electrode arranged, on the one substrate, in a region opened in correspondence to each of a plurality of subpixels arranged in matrix divided by the scanning lines and the data lines; and
at least one second electrode and at least one third electrode alternately arranged in a front view above the first electrode with an insulating film intervening,
wherein
the second electrode and the third electrode are independently driven, and
a voltage for driving the liquid crystal is individually applied between the second electrode and the first electrode and between the third electrode and the first electrode,
wherein
a reference potential is applied to the first electrode,
a potential for gradation-driving is applied to the second electrode in a case where a gradation level in a subpixel is in a range from a lowest gradation level to a specific gradation level, and
the reference potential is applied to the third electrode in the case where the gradation level in the subpixel is in a range from the lowest gradation level to the specific gradation level, and the potential for gradation-driving is applied to the third electrode in a case where the gradation level is in a range from a gradation level one higher than the specific gradation level to a highest gradation level.

2. The liquid crystal display apparatus according to claim 1, wherein
two scanning lines are included in a region of a subpixel,
active elements are provided respectively for the two scanning lines, and
the second electrode and the third electrode are driven respectively by the active elements.

3. The liquid crystal display apparatus according to claim 2, wherein
capacitance parasitic on each of the active elements in the region of the subpixel is substantially the same.

4. The liquid crystal display apparatus according to claim 1, wherein
a constant potential is applied to the second electrode in the case where the gradation level is in the range from the specific gradation level to the highest gradation level.

5. The liquid crystal display apparatus according to claim 4, wherein
the potential applied to the second electrode in the case where the gradation level is in the range from the specific gradation level to the highest gradation level is the same as the potential applied to the third electrode in the case where the gradation level is at the highest gradation level.

6. The liquid crystal display apparatus according to claim 1, wherein
the potential for gradation-driving is applied to the third electrode such that light transmittance of the liquid crystal at a gradation level one higher than the specific gradation level is larger than the light transmittance at the specific gradation level.

7. The liquid crystal display apparatus according to claim 1, wherein
a storage capacitance formed by the first electrode and the second electrode is substantially the same as the storage capacitance formed by the first electrode and the third electrode.

8. The liquid crystal display apparatus according to claim 1, wherein
the second electrode and the third electrode are formed on a same insulating film.

9. The liquid crystal display apparatus according to claim 1, wherein
the second electrode and the third electrode are formed on different insulating films.

10. A liquid crystal display apparatus, comprising:
a pair of substrates;
liquid crystal held between the pair of substrates;
a plurality of scanning lines arranged on one substrate of the pair of substrates;
a plurality of data lines arranged on the one substrate so as to cross the scanning lines;
a transparent and planar first electrode arranged, on the one substrate, in a region opened in correspondence to each of a plurality of subpixels arranged in matrix divided by the scanning lines and the data lines; and
at least one second electrode and at least one third electrode alternately arranged in a front view above the first electrode with an insulating film intervening,
wherein
the second electrode and the third electrode are independently driven,
a voltage for driving the liquid crystal is individually applied between the second electrode and the first electrode and between the third electrode and the first electrode,
a reference potential is applied to the first electrode,
a potential for gradation-driving is applied to the second electrode in a case where a gradation level in a subpixel is in a range from a lowest gradation level to a specific gradation level, and
the reference potential is applied to the third electrode in a case where the gradation level is in a range from the lowest gradation level to a gradation level one lower than the specific gradation level, and a potential for gradation-driving is applied to the third electrode in a case where the gradation level is in a range from the specific gradation level to a highest gradation level.

11. The liquid crystal display apparatus according to claim 10, wherein
a constant potential is applied to the second electrode in the case where the gradation level is in the range from the specific gradation level to the highest gradation level.

12. The liquid crystal display apparatus according to claim 11, wherein
the potential applied to the second electrode in the case where the gradation level is in the range from the specific gradation level to the highest gradation level is the same as the potential applied to the third electrode in the case where the gradation level is at the highest gradation level.

13. The liquid crystal display apparatus according to claim 10, wherein
the potential for gradation-driving is applied to the third electrode such that light transmittance of the liquid crystal at a gradation level one higher than the specific gradation level is larger than the light transmittance at the specific gradation level.

14. A liquid crystal display apparatus comprising:
a pair of substrates;
liquid crystal held between the pair of substrates;
a plurality of scanning lines arranged on one substrate of the pair of substrates;
a plurality of data lines arranged on the one substrate so as to cross the scanning lines;
a transparent and planar first electrode arranged, on the one substrate, in a region opened in correspondence to each of a plurality of subpixels arranged in matrix divided by the scanning lines and the data lines; and
at least one second electrode and at least one third electrode alternately arranged in a front view above the first electrode with an insulating film intervening,
wherein
the second electrode and the third electrode are independently driven, and
a voltage for driving the liquid crystal is individually applied between the second electrode and the first electrode and between the third electrode and the first electrode,
wherein
in a case where a gradation level in a subpixel is not more than a specific gradation level which is between a lowest gradation level and a highest gradation level, a voltage corresponding to the gradation level is applied between the second electrode and the first electrode and a constant voltage is applied between the third electrode and the first electrode, and
in a case where the gradation level is more than the specific gradation level, a constant highest voltage is applied between the second electrode and the first electrode and a voltage corresponding to the gradation level is applied between the third electrode and the first electrode.

15. A liquid crystal display apparatus, comprising:
a pair of substrates;
liquid crystal held between the pair of substrates;
a plurality of scanning lines arranged on one substrate of the pair of substrates;
a plurality of data lines arranged on the one substrate so as to cross the scanning lines;
a transparent and planar first electrode arranged, on the one substrate, in a region opened in correspondence to each of a plurality of subpixels arranged in matrix divided by the scanning lines and the data lines; and
at least one second electrode and at least one third electrode alternately arranged in a front view above the first electrode with an insulating film intervening,
wherein
the second electrode and the third electrode are independently driven, and
a voltage for driving the liquid crystal is individually applied between the second electrode and the first electrode and between the third electrode and the first electrode,
two scanning lines are included in a region of a subpixel and are not shared by subpixels adjacent in the direction crossing the scanning line,
active elements are provided respectively for the two scanning lines, and
the second electrode and the third electrode are driven respectively by the active elements.

* * * * *